United States Patent
Tracey et al.

(10) Patent No.: US 11,372,871 B1
(45) Date of Patent: Jun. 28, 2022

(54) PROGRAMMABLE FRAMEWORK FOR DISTRIBUTED COMPUTATION OF STATISTICAL FUNCTIONS OVER TIME-BASED DATA

(71) Applicant: Rapid7, Inc., Boston, MA (US)

(72) Inventors: David C. Tracey, Monasterboice (IE); Miguel A. Casanova, Dublin (IE)

(73) Assignee: Rapid7, Inc., Boston, MA (US)

( * ) Notice: Subject to any disclaimer, the term of this patent is extended or adjusted under 35 U.S.C. 154(b) by 223 days.

(21) Appl. No.: 16/798,222

(22) Filed: Feb. 21, 2020

(51) Int. Cl.
*G06F 16/00* (2019.01)
*G06F 16/2458* (2019.01)
(Continued)

(52) U.S. Cl.
CPC ...... *G06F 16/2471* (2019.01); *G06F 11/3006* (2013.01); *G06F 16/1734* (2019.01);
(Continued)

(58) Field of Classification Search
CPC ............. G06F 16/9024; G06F 16/2462; G06F 16/283; G06F 16/2228; G06F 16/1734;
(Continued)

(56) References Cited

U.S. PATENT DOCUMENTS 7,577,638 B2 * 8/2009 Chaudhuri .......... G06F 16/2462
7,620,633 B1 * 11/2009 Parsons ................. G06F 16/907
715/788

(Continued)

FOREIGN PATENT DOCUMENTS

WO WO2008144732 A1 * 11/2008
WO WO2013144535 A1 * 10/2013
(Continued)

OTHER PUBLICATIONS

Saket Sathe et al., "AFFINITY: Efficiently querying statistical measures on time-series data", IEEE 29th International Conference on Data Engineering (ICDE), Apr. 3, 2021, pp. 841-852.*
(Continued)

*Primary Examiner* — Srirama Channavajjala
(74) *Attorney, Agent, or Firm* — Robert C. Kowert; Kowert, Hood, Munyon, Rankin & Goetzel, P.C.

(57) ABSTRACT

Systems and methods are disclosed to implement a distributed query execution system that performs statistical operations on specified time windows over time-based datasets. In embodiments, the query system splits a statistical function into a set of parallel accumulator tasks that correspond to different portions of the dataset and/or function time windows. The accumulator tasks are executed in parallel by individual accumulator nodes to generate individual statistical result structures. The structures are then combined by an aggregator node to produce an aggregate result structure that indicates the results of the statistical function over the time windows. In embodiments, the accumulator and aggregator tasks are implemented and executed using a programmable task execution framework that allows developers to define custom accumulator and aggregator tasks. Advantageously, the query system allows queries with time-windowed statistical functions to be parallelized across a group of worker nodes and scaled to very large datasets.

20 Claims, 11 Drawing Sheets

(51) Int. Cl.
  *G06F 16/242* (2019.01)
  *G06F 11/30* (2006.01)
  *G06F 16/17* (2019.01)
  *G06F 16/182* (2019.01)
  *G06F 16/23* (2019.01)
(52) U.S. Cl.
  CPC ........ *G06F 16/182* (2019.01); *G06F 16/2322* (2019.01); *G06F 16/242* (2019.01)
(58) Field of Classification Search
  CPC ............... G06F 16/2322; G06F 16/242; G06F 16/2471; G06F 16/182; G06F 16/9038; G06F 11/3006; G06F 16/245; G06F 16/24565; G06F 16/254; G06F 16/9535; G06F 16/2455; G06F 16/90335; G06F 16/2445; G06F 16/24556
  See application file for complete search history.

(56) References Cited

U.S. PATENT DOCUMENTS

| | | | | |
|---|---|---|---|---|
| 7,779,340 | B2 * | 8/2010 | Milne | H04L 43/0847 714/799 |
| 7,814,482 | B2 | 10/2010 | Kwon et al. | |
| 8,090,730 | B2 * | 1/2012 | Shahabi | G06F 16/283 707/756 |
| 8,260,803 | B2 | 9/2012 | Hsu et al. | |
| 8,510,807 | B1 * | 8/2013 | Elazary | H04L 12/42 726/4 |
| 9,251,035 | B1 * | 2/2016 | Vazac | H04L 67/02 |
| 9,277,003 | B2 | 3/2016 | Doyle et al. | |
| 9,646,024 | B2 | 5/2017 | Srivas et al. | |
| 10,152,558 | B2 * | 12/2018 | Lisobee | G06F 16/9024 |
| 10,248,621 | B2 * | 4/2019 | Ward | G06F 16/2228 |
| 10,296,500 | B2 | 5/2019 | Dean et al. | |
| 10,296,658 | B2 * | 5/2019 | Le Biannic | G06F 16/9038 |
| 10,579,634 | B2 * | 3/2020 | Erdogan | G06F 16/2471 |
| 10,855,712 | B2 * | 12/2020 | Oliner | G06N 3/08 |
| 2007/0271547 | A1 | 11/2007 | Gulko et al. | |
| 2012/0078951 | A1 * | 3/2012 | Hsu | G06F 16/24532 707/769 |
| 2012/0191699 | A1 | 7/2012 | George et al. | |
| 2013/0007003 | A1 * | 1/2013 | Shyr | G06F 16/2228 707/741 |
| 2013/0198165 | A1 * | 8/2013 | Cheng | G06F 16/21 707/714 |
| 2014/0351233 | A1 * | 11/2014 | Crupi | G06F 16/24568 707/706 |
| 2016/0285805 | A1 * | 9/2016 | Oliver | H04L 63/308 |
| 2016/0328432 | A1 * | 11/2016 | Raghunathan | G06F 16/2264 |
| 2016/0335318 | A1 * | 11/2016 | Gerweck | G06F 16/2264 |
| 2016/0371363 | A1 * | 12/2016 | Muro | G06F 16/285 |
| 2017/0220938 | A1 * | 8/2017 | Sainani | G06F 16/248 |
| 2018/0089258 | A1 * | 3/2018 | Bhattacharjee | G06F 16/24535 |
| 2020/0387818 | A1 * | 12/2020 | Chan | G06Q 10/06 |

FOREIGN PATENT DOCUMENTS

| | | |
|---|---|---|
| WO | WO2014039336 A1 * | 3/2014 |
| WO | WO2014144889 A2 * | 9/2014 |
| WO | WO2016165509 A1 * | 10/2016 |

OTHER PUBLICATIONS

Liang Zhang et al., "TARDIS: Distributed Indexing Framework for Big Time Series Data", IEEE 35th International Conference on Data Engineering (ICDE), Jun. 2019, pp. 1202-1213.*
Pietro Pinoli et al., "Metadata management for scientific databases", Information Systems 81 (2019) pp. 1-20.*
Natasha Noy et al., "Google Dataset Search Building a search engine for datasets in an open Web ecosystem ", an open Web ecosystem, WWW '19: The World Wide Web ConferenceMay 2019 pp. 1365-1375.*
H. Papageorgiou et al., "Modeling statistical metadata", Proceedings Thirteenth International Conference on Scientific and Statistical Database Management. SSDBM 2001, Jul. 2001, pp. 25-35.*

* cited by examiner

CONFIGURE DISTRIBUTED QUERY EXECUTION 600

AUTO-ADJUST DEGREE OF PARALLELISM BASED ON: 610

☒ DATASET SIZE
☒ NUMBER OF DATASET PORTIONS / LOCATIONS
☐ STATISTICAL FUNCTION TIME RANGE
☐ NUMBER OF TIME WINDOWS FOR STATISTICAL FUNCTION
☐ NUMBER OF AVAILABLE TASK NODES

[ CONFIGURE CUSTOM POLICY 612 ]

ASSIGN TASK NODE BASED ON: 620

☒ LOCATION OF DATASET PORTION
☒ CURRENT LOAD OF TASK NODE
☐ TASK NODE PROPROTIES

[ CONFIGURE CUSTOM POLICY 622 ]

AUTO-RECOVERY FROM FAILURES: 630

☒ RETRY TASK WHEN TASK FAILS

[ CONFIGURE CUSTOM POLICY 632 ]

PROGRAMMABLE FRAMEWORK FOR DISTRIBUTED COMPUTATION OF STATISTICAL FUNCTIONS OVER TIME-BASED DATA

BACKGROUND

Many modern computer applications require statistical functions to be computed on time-based data. For example, some enterprise security management systems monitor a company's network by collecting and analyzing time-stamped event data from the network. The events may be collected in event logs, but not necessarily in a time-sequenced order. Security management systems may implement various assessment processes to analyze the event logs and provide query interfaces that allow users to search the event logs. Event log analysis and searching may require computation of a statistical function (e.g., the count, maximum, or minimum of an event attribute) on the log records for a specific set of time windows (e.g., for each of the past seven days). These types of computations can be extremely time-consuming and notorious difficult to manage due to the large size of the event logs, in some cases requiring hours to complete. Moreover, because the log data may be stored in heterogenous ways (e.g. distributed over a number of different storage locations) and not necessarily in a time-sequenced order, tracking and managing the progress of the statistical function computations can become a significant challenge. There is a need in the field for better solutions to compute statistical functions over time-based datasets that are more scalable, manageable, and flexible.

SUMMARY OF EMBODIMENTS

The systems and methods as described herein may be employed in various combinations and in embodiments to implement a distributed query execution system that performs statistical operations on specified time windows over time-based datasets. In some embodiments, when a query is received specifying a statistical function to be computed over a number of time windows, the distributed query execution system automatically splits the statistical function into a set accumulator and aggregator tasks. The accumulator tasks may correspond to different portions of the dataset and/or the function time windows, and aggregator tasks may be used to aggregate the results of the accumulator tasks. The accumulator tasks are executed in parallel by individual accumulator nodes to generate statistical result structures for each dataset portion time window. The statistical result structures are then combined by an aggregator node to produce an aggregate result structure that indicates the final results of the statistical function. In some embodiments, the accumulator and aggregator tasks are implemented and executed in a programmable task execution framework that allows developers to define custom accumulator and aggregator tasks. Advantageously, the disclosed system allows queries with time-windowed statistical functions to be parallelized across a fleet of worker nodes, in a manner that can be scaled to very large datasets and large numbers of time windows. Moreover, because the disclosed system divides the computation into a set of tasks, the computation can be easily tracked and managed based on these discrete units of work.

BRIEF DESCRIPTION OF THE DRAWINGS

FIG. 6 illustrates an example user interface used to configure operational aspects of a distributed query execution system, according to some embodiments.

Figure 1:
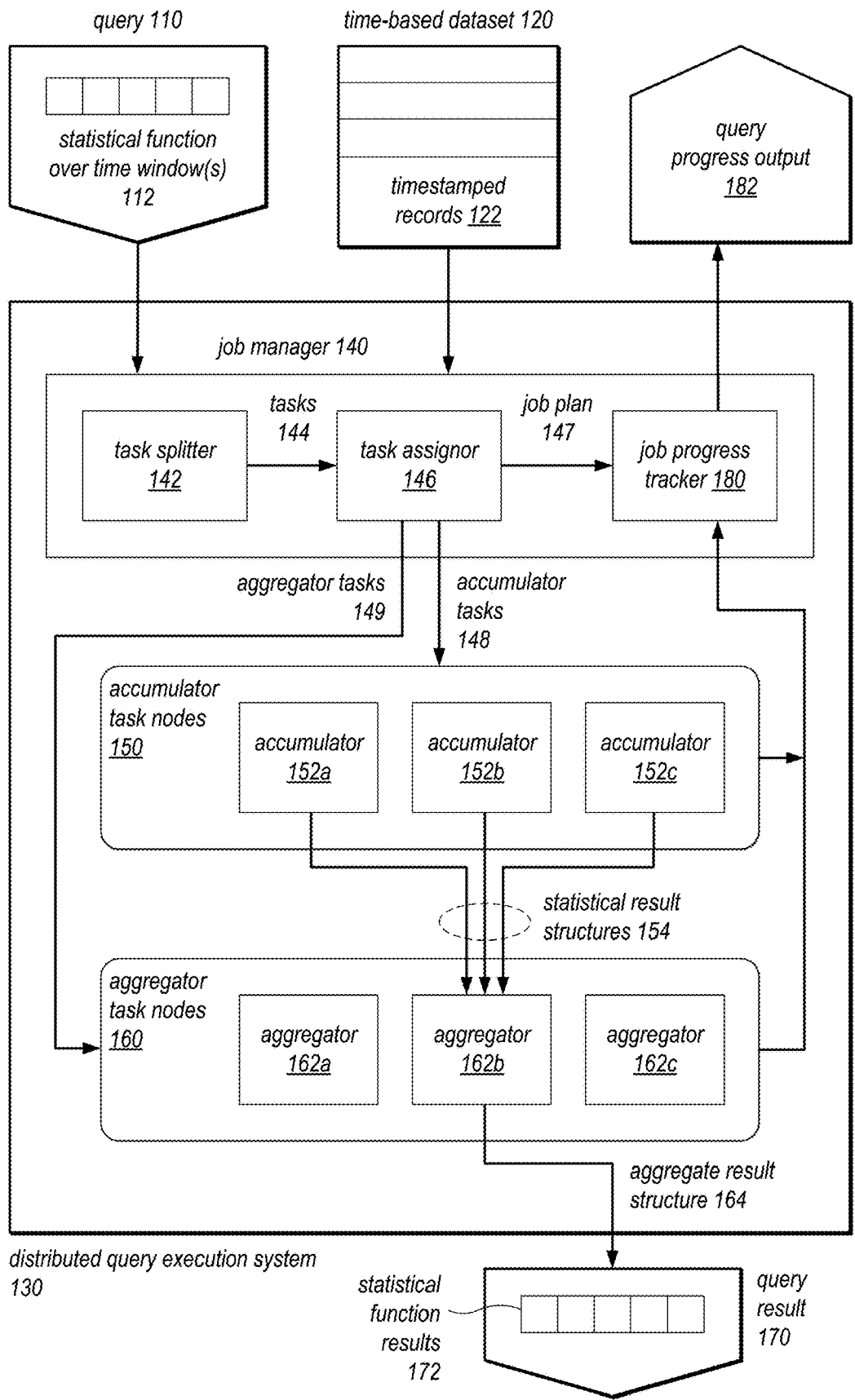
FIG. 1 is a block diagram illustrating an example distributed query execution system that performs a time-windowed statistical operation as a set of accumulator and aggregator tasks across task nodes, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Modern enterprise security management systems provide capabilities to monitor a company's network by collecting different types of event data from computing resources in the network. Event data may be stored in logs as timestamped log records, though not necessarily in a time-sequenced order. The enterprise security management system may implement a variety of processes to examine these logs to detect conditions such as security vulnerabilities, network attacks, or network breaches. In some embodiments, the enterprise security management system may provide user interfaces that allow users to perform queries to search the event logs.

The searching and analysis of event logs in this context commonly involve the computing a statistical function on log records for a specific set of time windows. For example, a user query may ask for the daily count of failed password attempts on a particular machine over the past 30 days. As another example, a particular assessment process may search the event logs for discrete time periods (e.g. hourly slices) where a latency metric of the network exceeded the 75-percentile historical value for that metric. In current systems, the efficient computation of these statistical functions poses a number of technical challenges. Due to the large size of the event logs, the statistical computations can be extremely time-consuming to perform. In some cases, a query or assessment may require minutes to compute just one statistic. Moreover, because the log data may be stored in an unsorted order and in a number of different storage locations, tracking and managing the progress of these long-running computations can be difficult.

To address these and other problems of existing timed-based data querying and analysis systems, embodiments of a distributed query execution system are disclosed capable of computing time-windowed statistical functions over time-based datasets in a distributed and parallelized manner. Embodiments of the distributed query execution system implement a job manager to automatically split the statistical function computation into a set of accumulator and aggregator tasks. The accumulator tasks may be configured to read data from different portions of the dataset and/or in different time windows. The accumulator tasks are executed in parallel by individual accumulator nodes to generate individual statistical result structures for their respective dataset portions or time windows. Each statistical result structure includes metadata that indicates the time windows of the statistical function that is accumulated in that result structure (e.g. the number and size of the accumulated windows). These statistical result structures produced by the accumulator tasks are then combined by the aggregator task(s) at one or more aggregator nodes to produce an aggregate result structure that indicates the final results of the statistical function. In some embodiments, the aggregator tasks may implement a number of different aggregation operations to handle different types of accumulator results structures. For example, a combine-type aggregation operation may be used to aggregate structures that have the same set of time windows. A concatenate- or merge-type operation may be used to aggregate structures that do not have the same set of time windows. In some embodiments, an aggregator task is configured to incorporate the results structures of each accumulator task as they become available, so that execution of the aggregator task is also partly parallelized with some of the accumulator tasks.

The distributed query execution system distributes the computation of the statistical function across a group of worker nodes, so that individual tasks of the computation can be performed in parallel to achieve better performance. In some embodiments, individual tasks may be assigned to individual files in the dataset in a manner that reduces lock contention on the files. In some embodiments, the set of tasks may be divided so that they are independent from one another (e.g. do not share data with one another). By dividing the tasks in this way, the computation can be easily scaled to operate over very large datasets.

Unlike other parallel execution frameworks such as Map-Reduce or Message Passing Interface (MPI), the disclosed distributed query execution system uses an execution/programming model that is specifically designed for accumulating and aggregating function results for time-stamped data. The execution/programming model reduces the complexity of orchestration needed to coordinate operations in generalized execution frameworks such as Map-Reduce. Moreover, because the disclosed system uses a set of uniformly defined result structures to share computation information among the tasks, the system provides a straightforward programming model that reduces the amount of effort required from developers to create generalized distributed application, using programming libraries such as MPI.

In some embodiments, the distributed query execution system may provide a configuration interface that allow users to configure how statistical functions are split into tasks and how the tasks are assigned to different worker nodes. For example, the distributed query execution system may allow the user to specify a policy that permits task splitting along different dimensions, such as by units of storage (e.g. one accumulator task per file), by time windows (e.g. one accumulator task for each time window), or by data locality (e.g. one set of tasks for each machine that stores a portion of the dataset). In some embodiments, the distributed query execution system may be configured to use a combination of multiple dimensions to generate tasks. In some embodiments, the distributed query execution system may be configured to automatically determine a degree of parallelism (e.g. the number of parallel tasks to generate) for a statistical function based on different runtime considerations. Such considerations may include the size of the dataset being queried, the number of portions in the dataset, the number of different locations that the dataset occupies, the number of time windows specified by the query for the statistical function, the overall time range for the statistical function, and the number of worker nodes available to carry out tasks.

In some embodiments, the distributed query execution system may provide a job management interface that allow users to view the progress of statistical function computations and control the execution of query jobs. The job management interface may indicate the progress of a computation or query job (e.g. a percent completion metric based on the number of tasks that have completed). In some embodiments, the job management interface may provide a partial result of the statistical function during query execution, based on the accumulator/aggregator tasks that have completed up to that point. In some embodiments, the job management interface may allow users to manually stop or start individual tasks in the query job, or pause or resume the entire query job. In some embodiments, the distributed query execution system may be configured to automatically retry individual tasks that had failed due to errors to recover from such errors.

In some embodiments, the distributed query execution system may be implemented based on a programmable task execution framework that allows developers to define custom accumulator and aggregator tasks. The execution framework may be configured to receive code modules that implement new accumulator and aggregator tasks, and dynamically load these modules at runtime to compute custom statistical functions using the worker nodes. Custom accumulator tasks may be defined to read log files in special formats or implement special filtering rules. As another example, custom accumulator or aggregator tasks may be combined or layered to compute more complex statistical functions (e.g. a function that implements if-else logic). Moreover, the programmable task execution framework may provide a library of modules that implement low-level operations for use by the custom tasks. For example, the library modules may implement operations to build, manipulate, or combine statistical results structures; read, transform, or write data records, or perform common statistical operations. These library modules can greatly reduce the burden of creating new custom tasks, allowing developers to create custom statistical functions much more rapidly.

As may be appreciated by those skilled in the art, embodiments of the distributed query execution system as described herein provides many technical advantages over existing time-based data querying and analysis systems of the state of the art, to improve upon the functioning of these existing systems. These and other features and benefits of the distributed query execution system are described in detail below, in connection with the figures.

FIG. 1 is a block diagram illustrating an example distributed query execution system that performs a time-windowed statistical operation as a set of accumulator and aggregator tasks across task nodes, according to some embodiments.

As shown, the depicted distributed query execution system 130 is configured to accept a query 110 as input and output a query result 170. The query 110 may be directed to a time-based dataset 120, which includes timestamped records 122. In some embodiments, the time-based dataset 120 may include log records of events, where each record includes a timestamp for an event. However, the time-stamped records 122 may not necessarily be stored in a time-sequenced order. Each record may include a set attributes (e.g. attributes about the events), which may include numerical attributes used to compute statistical functions. In some embodiments, the dataset 120 is distributed over many different locations (e.g. as different servers, networks, repositories, or geographic locations, etc.).

As shown, the query 110 may specify a statistical function 112 to be computed over one or more time windows or time slices. For example, the query 110 may specify to output, for each of the last 52 weeks, a daily average of a particular type of event observed during that week. In response, the query execution system 130 will generate a query result 170 that indicates the statistical function results 172 for each individual time window (e.g. the daily averages for each of the 52 weeks). It is noted that in some cases, the statistical function results 172 may not be outputted as part of the query result 172, and may be used in other ways by the query 110. For example, the statistical function results 172 may be used as a part of a query filter or sort criteria or as intermediate values for computing other output values.

Depending on the embodiment, the query 110 may be received in a variety of forms. For example, the query may be specified in a query language such as Structured Query Language (SQL) or in some other specialized query language. The query may be received via a user interface (e.g. a command line or graphical user interface (GUI)), or a programmatic interface (e.g. an application programming interface (API) or a web service interface). In some embodiments, the distribute query execution system 130 may be implemented as a web service, and provide a querying interface configured to receive queries 110 and produce query results 170 as objects formatted in the Javascript Object Notation (JSON) format.

As shown, the distributed query execution system 130 may implement a job manager component 140, which may be a software component or a separate hardware component such as a computing device. In some embodiments, the distributed query execution system 130 may be implemented using a connected network of compute nodes, and the job manager 140 may be implemented on one or more of the nodes to handle the computation of statistical functions embedded in the queries. In some embodiments, the job manager 140 may be implemented as one or more running processes or threads that can be invoked by a query engine to produce the statistic function results 172 for different statistical functions 112.

As shown in this example, the job manager 140 implements a task splitter component 142, a task assignor component 146, and a job progress tracker component 180. The task splitter 142 may be configured to split the computation of the statistical function 112 into a number of tasks 144, which will include a number of accumulator tasks 148 and aggregator tasks 149. In some embodiments, the accumulator tasks 148 are configured to read the time-based dataset 120 and produce individual statistical results structures 154. In some embodiments, the aggregator task(s) 149 are configured to receive and aggregate the statistical result structures 154 produced by the accumulator tasks to generate an aggregate result structure 164, which is then used to produce the ultimate statistical function results 172.

In some embodiments, the task splitter 142 will generate the tasks 144 to compute a statistical function automatically and dynamically, for each incoming statistical function 112. The generation or splitting of tasks may be performed according to configuration rules or policies provided by a user or administrator of the system via a configuration interface. In some embodiments, the task splitter 142 may elect to not employ task splitting for a small query or simple statistical function computation, and simply perform the computation as a single task, on a single node. In some embodiments, the task splitter 142 may automatically determine a degree of parallelization for a query or computation that is sufficiently large or complex. The degree of parallelization may be determined based on runtime conditions to determine how many accumulator and aggregator tasks will be created. The degree of parallelization may depend on a parameters such as the size of the dataset 120, the number of different portions (e.g. files, volumes, repositories, or other divisible portions) of the dataset, the number of different locations of the dataset, the specified time range of the statistical function 112, the number of time windows of the statistical function, and the number and operating conditions of available task nodes 150 and 160 for performing the tasks. In some embodiments, the task splitting may be performed using multiple task splitting dimensions. For example, the task splitter may generate one group of accumulator tasks for each of three distinct data files, and one task in each group for each of 10 statistical function time windows. As another example, the task splitter may generate one aggregator task for each of four different data repositories, and a final aggregator task to aggregate results from the four repositories. The precise task splitting strategy may be controlled by configuration information provided by a user. For example, the configuration information may specify a rules, formulas, or policies for task splitting (e.g., priority ordering and/or weights for different task split dimensions).

As shown, the task assignor 146 in this example will assign the tasks 144 to different worker nodes 150 and 160. In some embodiments, the task nodes 150 and 160 may be individual compute nodes, virtual machines instances, or container instances managed by the system 130. In some embodiments, the task splitter 142 and the task assignor 146 may be implemented as a single decision step by a single software component. As with the task splitting process, the task assignor may assign the tasks 144 according to a configurable set of rules or policies. Task assignment may depend on a number of factors. For small queries or simple statistical function computations, the task assignor may assign all tasks to a single node. For computations that may benefit from distributed execution, the task assignor will assign individual tasks to different worker nodes. For example, a task that accesses a particular portion of the dataset may be assigned to a task node that has local access to that portion. In this manner, performance of the task will not require data in the portion to be transmitted over the network, which is less efficient and less secure. As another example, multiple tasks that require access to a common portion of the dataset may be assigned to the same task node, so as to allow that node to optimize the reading of the portion by these tasks (e.g. by allow the multiple tasks to share a common cache or file lock). As another example, a task node that has been assigned a group of related accumulator tasks may also be assigned an aggregator task dedicated to the group, so that it can collect all of the statistical result structures produced by the group locally on that node, thereby reducing inter-node network traffic. As yet another example, task nodes may be selected for particular tasks based on their capabilities (e.g. memory size, processing power, network bandwidth) and their current load or usage level. A node that is relatively free may be preferred over a node that is under heavy load or currently executing another task with a higher priority.

In some embodiments, the task assignor 146 may generate a job plan 147, which may include a data structure (e.g. a task map) that indicates which tasks have been assigned to which task nodes 150 and 160. In some embodiments, the task map may also be used by other components (e.g. the job progress tracker 180) to monitor the tasks and track the progress of the query job or statistical function computation. In some embodiments, the task assignor 146 may also be configured to monitor the operational condition of the task nodes, including information such as the current load, resource utilization, and health of the nodes. Such information may be maintained in a node table and updated periodically based on polling or received heartbeats from the nodes. The information in the node table may also be used to make task assignment decisions.

As shown, the task nodes in this example are split into two groups: the accumulator task nodes 150 and the aggregator task nodes 160. In some embodiments, the two sets of task nodes 150 and 160 may be the same set of nodes. In some embodiments, there may be multiple sets of task nodes that are distributed across different locations, for example, different networks, data centers, or geographic locations. The task nodes 150 and/or 160 may be maintained in one or more node pools that can be reused to execute statistical function tasks for different queries. In some embodiments, membership in the node pool may be managed by the distributed query execution system 130, so that problematic or malfunctioning nodes are removed or restarted, and new nodes are added to the pool as demand for statistical function tasks increases.

In some embodiments, the job manager itself may be implemented on one of the task nodes 150 or 160. In such a master-to-master model of execution, for each query or statistical computation, a coordinator node is selected from the node pool(s) to act as the job manager 140 for that query or computation. The coordinator will be responsible for performing at least some of the operations described above for the job manager 140, such as splitting a computation into tasks, assigning the tasks to nodes, and tracking the progress of the computation or partial results of the computation. In some embodiments, the coordinator node may also be configured to performed some of the aggregation task to apply statistical aggregation on worker outputs. In some embodiments, the coordinator may be selected for each query or statistical function computation to manage that query execution or computation. The election of the coordinator may be performed based on a number of selection schemes (e.g. round robin, random, voting protocol, etc.), and be influenced by a number of factors (e.g. node capability, condition. location, etc.). In some embodiments, multiple coordinator nodes may be selected to performed different functions of the job manager (e.g. splitting versus results tracking). In some embodiments, a replacement coordinator node will be selected if the initial coordinator fails or becomes unavailable during the query, or if the query is resumed or restarted after a pause.

Each of the task node 152*a-c* or 162*a-c* may be capable of executing multiple accumulator or aggregator tasks. In some embodiments, each accumulator or aggregator task may be executed as an individual process or thread on a task node 152 or 162. The task processes or threads may also be maintained in a process or thread pool and reused for different tasks. Process or thread pools allow processes or threads to be recruited immediately for newly assigned tasks, and avoids the heavy costs of initiating new processes or threads for new tasks.

In some embodiments, the accumulator nodes 152 and aggregator nodes 162 are loaded with software that allow these nodes to be used as part of a distributed execution framework. In some embodiments of such a framework, a coordinator node is configured to as the job manager 140 to assign and manage the task, and the task nodes are configured to receive and execute the tasks and report task results back to the coordinator node. In some embodiments, the coordinator node is able to manage the distributed execution a variety of different tasks on top of the task nodes 150 and 160.

As shown, the accumulator nodes 152 may each execute an individual accumulator task to produce an individual statistical result structure 154. The statistical result structure 154 may be a data structure with defined fields that capture the result of the statistical function computed for a particular portion of the dataset 120, a particular time window, or some other slice of the records 122. In some embodiments, the statistical result structure 154 may be statically defined to include a set of attributes. These attributes may indicate, for each result, the type of statistical function computed, the time windows for which the function was computed, an attribute over which the function was computed, intermediate values generated for each time window, and the result of the function computed for each time window. In some embodiments, the statistical result structure 154 may be used for a number of different statistical functions. In some embodiments the fields of the statistical result structure 154 may be used differently based on the type of the statistical function.

In some embodiments, the aggregator tasks may be configured to receive the statistical result structures 154 as they become available (e.g. in the order that they were completed). For example, as the accumulator nodes complete each result structure 154, the structures may be added to a queue in a first-in-first-out (FIFO) fashion, and the aggregator node(s) may consume the structures in the order that they were generated. In some embodiments (e.g. where there is only one aggregator node), the accumulator nodes may provide the statistical result structures directly to the aggregator node as they are completed. Accordingly, the aggregator nodes may begin to perform the aggregation task even while some accumulate tasks have not yet finished.

As discussed, in some embodiments, the job manager 140 may elect to generate multiple aggregator tasks for a single statistical function computation. For example, depending on the circumstances and the configuration policy of the task splitter 142, aggregator tasks may be created for individual dataset portions (e.g. individual files), dataset locations, function time ranges, accumulator node groups, etc. The job manager 140 may create additional aggregator tasks to implement multiple stages of aggregation to produce the final aggregate result structure 164.

As shown, the job manager 140 in this example also implements a job progress tracker 180, which is configured to monitor and track the progress of a computation or query job. In some embodiments, the job progress tracker 180 may be configured to receive status information from the task nodes 152 and 162, and use this status information to produce query progress output 182 to indicate the execution progress of the query 110 or the computation of the statistical function 112. The progress output 182 may be determined based on the number of discrete tasks 148 and 149 that have been completed. For example, where the task splitter has created 100 accumulator jobs, and 70 of the 100 jobs have been confirmed to be completed, the job progress tracker 180 may report that the query execution progress is at 70%. In some embodiments, the job progress manager 180 may poll each individual task (e.g. each task thread, process, or node) to obtain their status information. In some embodiments, the task thread, process, or node may each be configured to report its status to the tracker. Such reporting may occur on a periodic basis, or based on the occurrence of certain events (e.g. task completion, task pause, task failure, etc.). In some embodiments, aggregator tasks may be configured to report partial results to the tracker 180 (e.g. aggregate results of the statistical function that have been computed based on only a subset of completed tasks). For some types of statistical functions (e.g. average), the job progress tracker 180 may be configured to report the partial results as approximate or incomplete results of the statistical function.

As shown, the final aggregate result structure 164 may be used to generate the statistical function results 172 in the query result 170. Depending on the query interface, the query result 170 may be returned in a variety of ways. The result may be returned via a user interactive interface such as a GUI, or via a programmatic interface such as a web service response (e.g. a JSON object) or an API response. The statistical function results 172 may indicate the computed result of the statistical function for each time window specified in the query. In some embodiments, the query interface may display the statistical function result 172 as a graphical object (e.g. a time graph showing the results for each time window). In this manner, the distributed query execution system may be configured to compute a variety of statistical functions over the time-based dataset, including the count of particular set of matched records; the total byte size of matching records; the total, minimum, maximum, average, or percentile value of individual record attributes; or other types of custom statistics that can be added by task developers.

Figure 2:
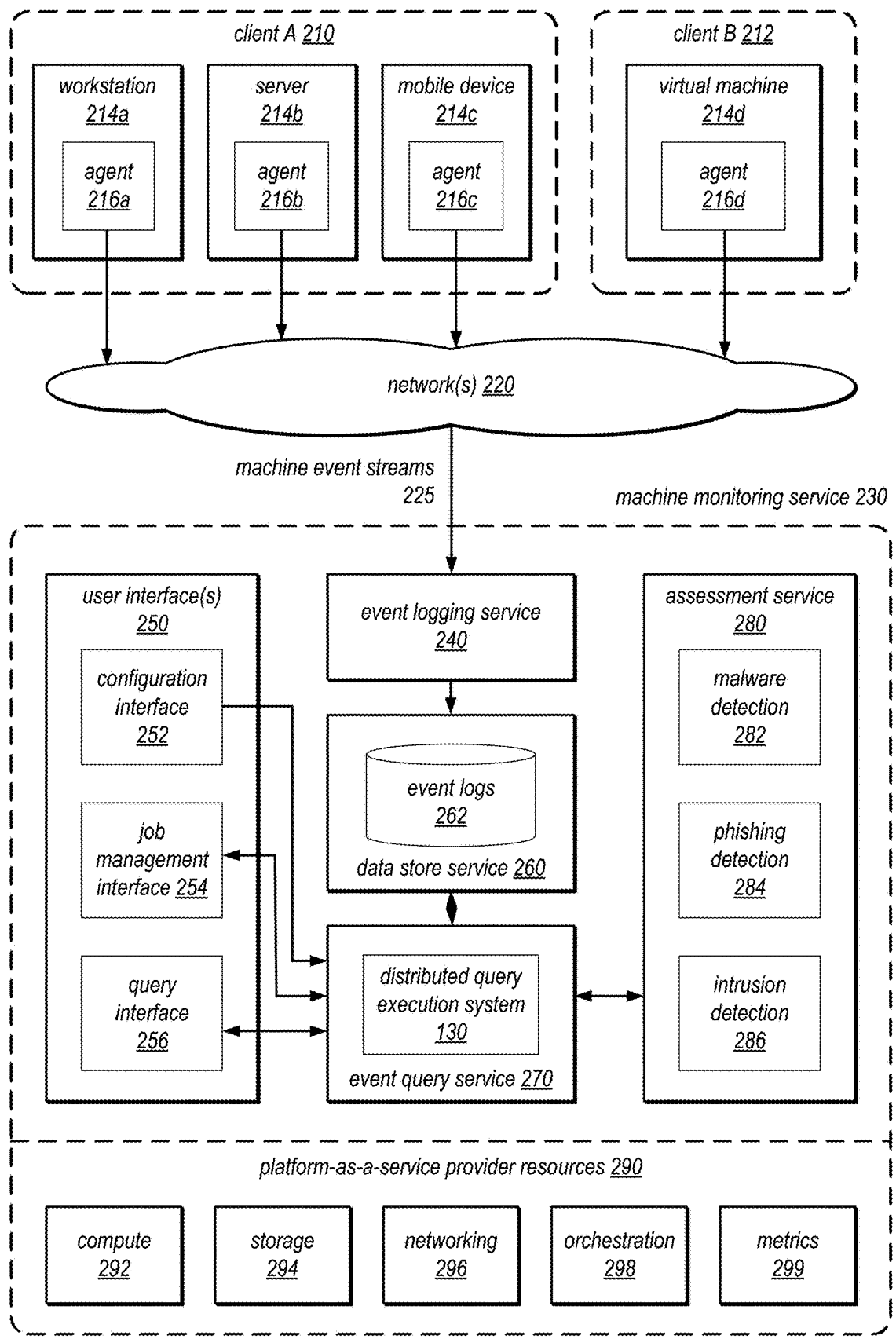
FIG. 2 is a block diagram illustrating a machine monitoring service implemented in a platform-as-a-service provider network that implements a distributed query execution system for machine event data, according to some embodiments.

FIG. 2 is a block diagram illustrating a machine monitoring service implemented in a platform-as-a-service provider network that implements a distributed query execution system for machine event data, according to some embodiments.

As shown in FIG. 2, an embodiment of the distributed query execution system 130 of FIG. 1 is implemented in a machine monitoring service 230. In some embodiments, the machine monitoring service 230 may be a service implemented in the cloud and on a platform-as-a-service (PaaS) provider network. The machine monitoring service 230 may be configured to communicate with many agents 216*a-d* deployed on remote machines 214*a-d* over one or more networks 220. In some embodiments, the agents may be configured to collect or generate machine events 225 about the remote machines, and transmit the machine events to the machine monitoring service 230. The machine monitoring service 230 may receive machine events from many different clients (e.g. different entities, companies, organizations, groups, geographic locations, networks, etc.), and perform remote monitoring of the computing resources of these different clients. In some embodiments, distinct clients 210 and 212 may be associated with a different user account of the machine monitoring service 230.

As shown, the clients in this example may operate different types of computing resources, such as a workstation 214*a*, a server 214*b*, a mobile device 214*c*, and a virtual machine 214*d*. The virtual machine 214*d* may be an instance of a computer and operating system that is emulated and hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. Another type of virtualized execution environment may be a container, which provides a portable and isolated execution environment over a host operating system of a physical host. Example implementations of container technologies include DOCKER, GOOGLE KUBERNETES, AMAZON WEB SERVICES, and MICROSOFT AZURE. Depending on the embodiment, the agents 216 may be deployed on other types of computing systems, including embedded systems, networking devices, storage devices, Internet-of-Things (IoT) devices, vehicles, and the like.

In various embodiments, the network 220 may encompass any suitable combination of networking hardware and protocols necessary to enable communications between the agents 216 and the machine monitoring service 230. In some embodiments, the remote machines 214 may execute in a private network of a company, behind a company firewall, and the network 220 may include a public network such as the Internet, which lies outside the firewall. The network 220 may encompass the different telecommunications networks and service providers that collectively implement the Internet. In some embodiments, the network 220 may also include private networks such as private local area networks (LANs), private wide area networks (WANs), or private wireless networks. The network 220 may be implemented using different hardware (e.g., modems, routers, switches, load balancers, proxy servers, etc.) and software (e.g., protocol stacks, routing software, firewall/security software, etc.) for establishing networking links between the remote machines 214 and the machine monitoring service 230. In some embodiments, the agents 216 may transmit the machine events 225 to the machine monitoring service 230 over the network 220 using secure communication channels such as transport layer security (TLS) connections implemented over the network 220.

As shown in this example, the machine monitoring service 230 is implemented using a number of constituent services 240, 250, 260, 270, and 280 implemented within a PaaS service provider network. The agents 216 and other clients of the machine monitoring service 230 may convey services requests to and receive responses from PaaS provider network via network 220. In some embodiments, the service request and responses may be SOAP-based web services requests and responses and formatted as JSON documents. In some embodiments, the machine assessment service 230 may implement service interfaces using other types of remote procedure calling protocols, such as GOOGLE PROTOCOL BUFFERS. The PaaS provider network may provide the hardware and/or software needed to implement service endpoints for these services, such that a request directed to a service is properly received by the endpoints.

As shown, the PaaS provider network may provide different types of computing resources 290, which can be leased by service customers to implement custom hosted services. As shown, the PaaS provider may provide resource services such as compute resource service 292, storage resource service 294, networking resources service 296, orchestration service 298, and resource metrics service 299. The services of the machine monitoring service 230 may be built using these underlying resource services provided by the PaaS provider. In some embodiments, the PaaS resources 290 may implement features such as load balancing of incoming service requests and/or dynamic management and scaling of service node pools. In some embodiments, each of the services 240, 250, 260, 270, and 280 may be implemented using a pool of service nodes provided by the PaaS provider, which may be individual instances of virtual machines. In some embodiments, the PaaS provider may be a provider such as AMAZON WEB SERVICES or MICROSOFT AZURE.

In some embodiments, the machine monitoring service 230 may be configured to monitor, analyze, and take action on security-related incidents that are detected on the remote machines 214 or entire remote company networks. As shown in this example, an event logging service 240 is provided to receive machine event streams 225 from the remote machines. The event logging service 240 may log the received events into one or more event logs 262. As shown, the event logs 262 may be stored by one or more data storage service 260, which may be provided by or implemented using the resources 290 of the PaaS network. In some embodiments, the event logs may be stored in one or more databases. In some embodiments, the event logs may be stored as files in file systems. In some embodiments, the event logs may be stored in separate files or data stores, which may be distributed across multiple geographic locations.

In some embodiments, the machine monitoring service 230 may allow users or clients to view, analyze, and receive alerts and/or reports about the logged event data. For example, the service may allow users to run queries about the collected events for their machines using a query interface 256. The query interface 256 may be configured to submit queries to an event query service 270 that is configured to answer queries directed to the event log data stores. As shown, the distributed query execution system 130 of FIG. 1 may be implemented as part of this event query service 270. In some embodiments, the event query service 270 may implement an existing query engine (e.g. a SQL query engine), and the distributed query execution system 130 may be added as an adjunct component on top of the existing query engine. In some embodiments, the task nodes 150 and 160 of FIG. 1 may be provided by the underlying PaaS provider network, as pools of managed virtual machine instances. In some embodiments, communication mechanisms between the components of the system 130 (e.g. message queues) may be implemented using orchestration components provided by the PaaS network.

As shown, in some embodiments, event query service 270 may be used by other assessment services 280 to perform automated machine assessment processes. The various components of the assessment service 280 may perform ad hoc queries on the event logs via a service interface or API to examine the logged event data for a variety of purposes. For example, the malware detection module 282 may examine the machine event logs to detect the installation of a particular type of malware executable. As another example, a phishing detection module 284 may examine the email event logs to detect phishing attacks using new or unusual email addresses, web addresses, or email content. As yet another example, an intrusion detection module 286 may examine the event logs to detect suspicious communication patterns or attacker packet signatures. In some embodiments, these conditions may cause the assessment service 280 to generate alerts or notifications, or perform mitigation actions.

As shown, the machine monitoring service 230 may implement a set of user interfaces 250, which may be implemented as GUIs or web interfaces viewable using a web browser. In some embodiments, these user interfaces 250 may be implemented by client-side applications. As shown, the user interfaces may include a query interface 256 to allow users to query the event logs and specify statistical functions (e.g. statistical function 112 of FIG. 1). The queries may be submitted in a query language or via a GUI interface. In some embodiments, responses to a query may be provided as graphical objects (e.g. a time graph showing the statistical function results 172).

In some embodiments, the user interfaces 250 may also implement a configuration interface 252. The configuration interface 252 may be used to configure various aspects of the machine monitoring service 230, including aspects of the distributed query execution system 130. For example, the configuration interface 252 may be used to specify parameters of a task splitting or assignment policy that controls how statistical functions are divided into tasks and how the tasks are assigned to task nodes. In some embodiments, some such control parameters may be specified via the query interface (e.g. as an optimization hint to the system to indicate how a statistical function should be parallelized). The configuration interface 252 may also be used to control other operational aspects of the distributed query execution system, including when computations of statistical functions should be parallelized, how to recover from failed tasks, and how to properly size the task node pool, etc.

In some embodiments, the user interfaces 250 may also implement a job management interface 254. The job management interface 254 may be used to visualize and control a particular query execution job. In some embodiments, the query progress output of FIG. 1 may be provided via the job management interface 254. Additionally, the job management interface may allow user to control the execution of an ongoing query job. For example, the job management interface may allow a user to manually stop, pause, or resume a query job or particular tasks within a query job. In some embodiments, the job management interface may allow users to manually modify a query job during runtime, for example, to add or remove dataset portions or statistical function time windows. In some embodiments, the job management interface may provide a partial result of the statistical function computation based on accumulator or aggregator tasks that have been completed up that that point.

Figure 3A:
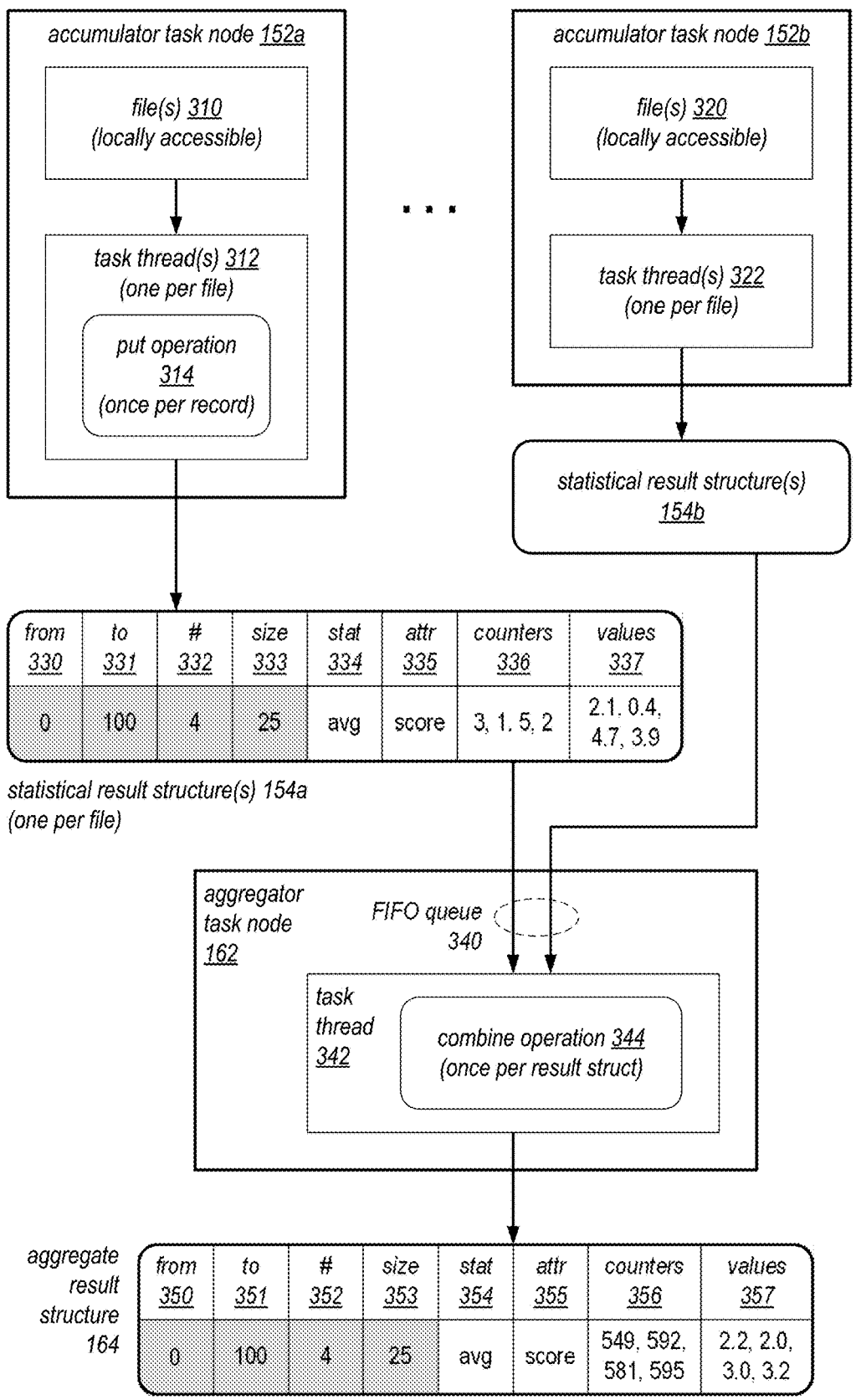
FIGS. 3A to 3C illustrate examples operations of accumulator and aggregator task nodes in a distributed query execution system and result structures produced by the operations, according to some embodiments.
Figure 3B:
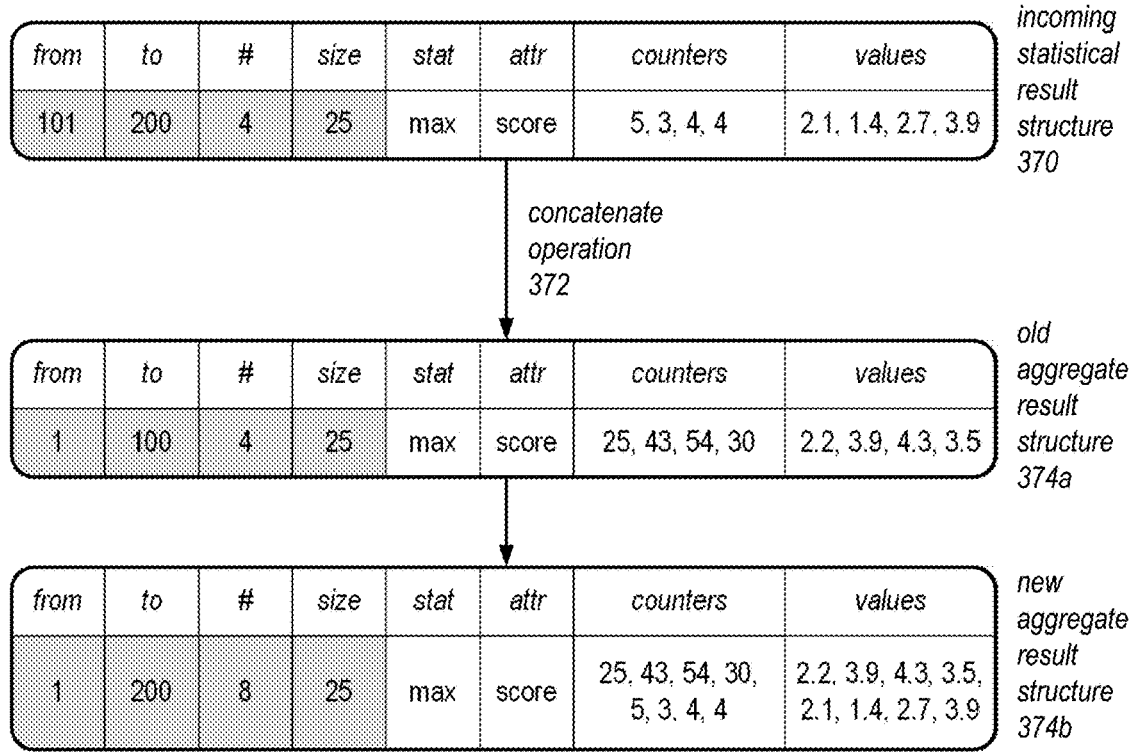
Figure 3C:
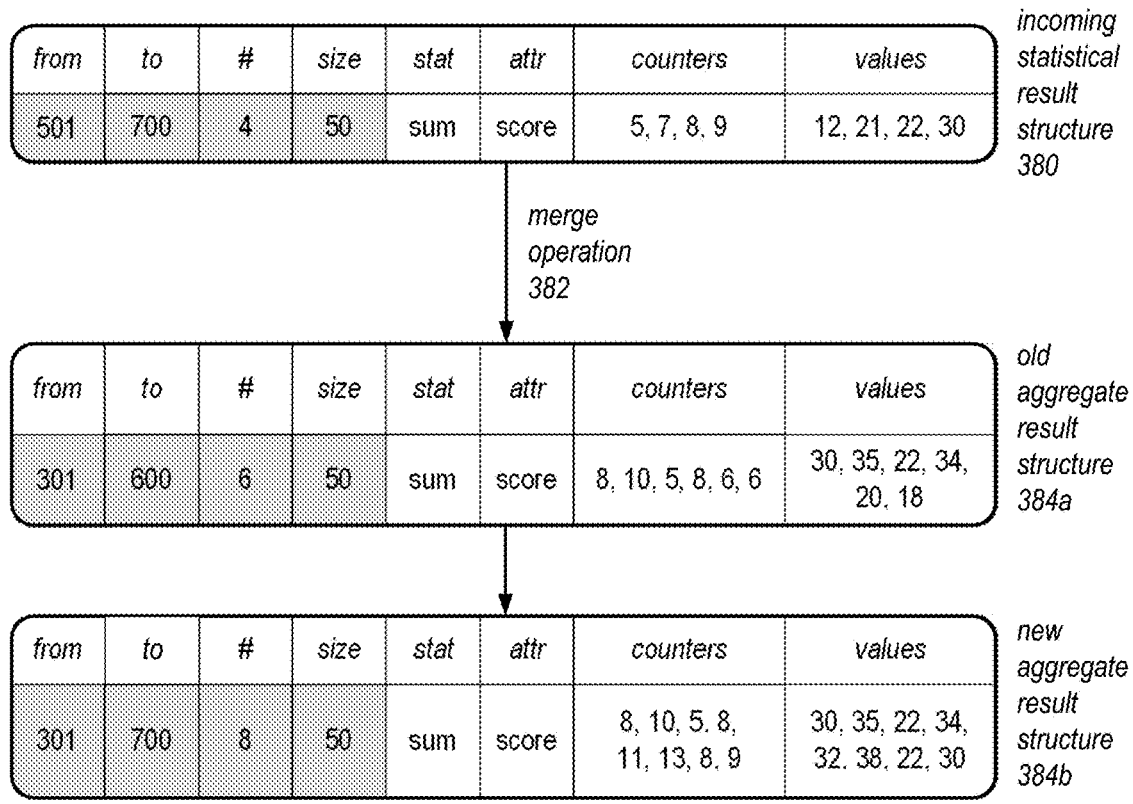

FIGS. 3A to 3C illustrate examples operations of accumulator and aggregator task nodes in a distributed query execution system and result structures produced by the operations, according to some embodiments.

FIG. 3A shows an example of operations that may be implemented by the accumulator task nodes 152 and aggregator task nodes 162 of FIG. 1. In the figure, the accumulator task nodes 152a and 152b are each executing a respective task thread 312 and 322. As discussed, in some embodiments, each task may be executed as a separate thread. As shown in this example, each task thread has been assigned a file. In some embodiments, the time-based dataset may be stored as multiple of files (e.g. log files) that are locally accessible from the individual task nodes (e.g. stored on storage devices locally accessible to the nodes). In some embodiments, to reduce data traffic over the network, a task that accesses a particular file is assigned to a node that has local access to that file. In some embodiments, the files may reside in a particular local area network, and only task nodes in that local area network can be assigned tasks that access those files. In this example, because one accumulator task is assigned to each file, one statistical result structure (154a and 154b) will be produced for each file.

As shown, the accumulator task 312 in this example uses a put operation 314. In some embodiments, the put operation is a low-level operation used by different accumulator tasks (e.g. for different types of statistical functions). In some embodiments, the put operation may be a library function provided by the distributed query execution system, and can be used in newer custom tasks. In some embodiments, the accumulator task may consume successive records from the file. For each incoming record, the accumulator task will parse the record, filter the record according to the task logic, and invoke the put operation 314. The put operation will update a statistical result structure 154a for each incoming record to incorporate that record into the result structure 154a. The following example illustrates one execution of the put operation. In the example, Table A1 below indicates the contents of a statistical result structure being built by an accumulator task for the "sum" statistic over the "score" attribute.

TABLE A1 statistical result structure before put operation

| from | to | # | stat | attrib | counters | | | | values | | | |
|---|---|---|---|---|---|---|---|---|---|---|---|---|
| 0 | 100 | 4 | sum | score | 3 | 1 | 5 | 2 | 2.1 | 0.4 | 4.7 | 3.9 |

When a next invocation put(timestamp=17, score=0.1) is made by the accumulator task for a new record, the contents of the statistical result structure is updated as shown in Table A2. Because the new record has a timestamp of 17, it falls within the first time window in the result structure. The counter and value for the first window are updated to incorporate the new record.

TABLE A2 statistical result structure after put operation

| from | to | # | stat | attrib | counters | | | | values | | | |
|---|---|---|---|---|---|---|---|---|---|---|---|---|
| 0 | 100 | 4 | sum | score | 4 | 1 | 5 | 2 | 2.2 | 0.4 | 4.7 | 3.9 |

As shown, the statistical data structure 154a in this example includes a number of fields 330-337. Field 334 indicates that the statistical function being computed in this case is an average function, and field 335 indicates the record attribute ("score") that is being averaged. As new records are incorporated into the statistical result structure using the put operation 314, the counters field 336 and values field 337 are updated to reflect each new record. In some embodiments, the put operation 314 may be used for a number of different types of statistical function operations, such as count, average, sum, maximum, minimum, and the like. The put operation may update the fields of the result structure 154a in different ways depending on the type of the statistical function. In some embodiments, the result structure may include additional fields to hold different types of intermediate data needed to compute different types of statistical results. The accumulator task 312 will access the file 310 to process all relevant records and repeatedly update the result structure 154a with those records. When all relevant records have been processed and incorporated into the result structure 154a, the accumulator task is complete, and the result structure will be passed to the aggregator task node 162 to be combined with other statistical result structures (e.g. structure 154b).

As shown, in some embodiments, the result structure 154a may also include metadata fields such as fields 330, 331, 332, and 333. Fields 332 and 333 in this example indicate the number and size of the time windows represented by the result structure. Fields 330 and 331 indicate the time range of the result structure. In some embodiments, these metadata fields are used by the aggregator task to combine statistical result structures produced by the different accumulator tasks. As will be appreciated by those skilled in the art, other types of metadata fields may be used in the result structure, depending on the embodiment. For example, in some embodiments, one of fields 332 and 333 may be skipped, because one of the fields can be inferred from the other field.

As shown, the statistical result structures 154 produced by the accumulators are provided to the aggregator task node 162, which executes another task thread 342 to perform the aggregator task. In some embodiments, the accumulator tasks may send the result structures directly to the aggregator task. In other embodiments, the result structures 154 may be sent to the aggregator task indirectly, via a coordinating component such as the job manager 140 or a result structure queue. The aggregator task is configured to aggregate the result structures 154 produced by the accumulator tasks into the aggregate result structure 164, which represents the final result of the statistical function.

In some embodiments, the aggregator node 162 may implement a FIFO queue 340 to receive and process statistical result structures 154 from the accumulator tasks in FIFO order. The aggregator task may execute in parallel with the accumulator tasks to process incoming statistical result structures 154 as they become available, in the order that they were completed. In some embodiments, the FIFO queue 340 may be implemented outside of the aggregator task, and multiple aggregator tasks may share the workload from a single queue 340.

In some embodiments, the aggregator task thread 342 may use a combine operation 344 to build the aggregate result structure 164. Like the put operation 314, the combine operation 344 may be provided as a library function, and can be used of process results structures for different types of statistical functions. In some embodiments, the combine operation 344 is used to process statistical result structures that have a common set of time windows, and is executed once per result structure 154 to update the aggregate result structure 164. In this example, the statistical result structure 154a has the same time windows as the aggregate result structure 164. Accordingly, the aggregator task thread will use the combine operation to update a copy of the aggregate result structure 164 (fields 356 and 357) to incorporate the statistical result structure 154a into the aggregate result structure. As shown by the counters field 356, the aggregate results structure 164 includes the results from a much larger number of timestamped records.

As may be appreciated, where the "counter" of a particular time window is zero, the combine operation may treat the "value" of the window specially. In this case, the "value" of the window is understood to be "absent," as opposed to the actual numerical value of the "value" field. For example, a combine operation on the two following result structures (Tables B1 and B2) will produce an aggregate result structure shown in Table B3. As shown, even though the "value" field of the second window of structure B1 is shown to be zero, because the "counter" of the window is zero, the combine operations treats that "value" as an indicator of absence when computing the minimum value in the aggregate result structure in B3. On the other hand, the fourth window "value" of structure B1 is also zero. This zero, however, represents a real computed minimum of that window, because the "counter" for that window is non-zero. Accordingly, the combine operation treats the zero value in the fourth window as an actual value when computing the minimum value of that window.

TABLE B1 first input result structure

| from | to | # | Stat | attrib | counters | | | | values | | | |
|------|-----|---|------|--------|---|---|---|---|---|---|---|---|
| 0 | 100 | 4 | min | score | 4 | 0 | 1 | 3 | 2.1 | 0.0 | 3.3 | 0.0 |

TABLE B2 second input result structure

| from | to | # | Stat | attrib | counters | | | | values | | | |
|------|-----|---|------|--------|---|---|---|---|---|---|---|---|
| 0 | 100 | 4 | min | score | 4 | 2 | 5 | 1 | 3.4 | 8.0 | 1.4 | 4.6 |

TABLE B3 aggregate result structure from combining result structures in B1 and B2

| from | to | # | Stat | attrib | counters | | | | values | | | |
|------|-----|---|------|--------|---|---|---|---|---|---|---|---|
| 0 | 100 | 4 | min | score | 8 | 2 | 6 | 4 | 2.1 | 8.0 | 1.4 | 0.0 |

FIG. 3B depicts another type of operation (concatenate operation 372) that may be used by an aggregator task, in some embodiments. As with the combine operation 344 of FIG. 3A, the concatenation operation 372 may also be provided as a library function, which can be used to define custom aggregator tasks. The concatenate operation 372 may be used to process statistical result structures for different types of statistical functions. With this operation, two statistical result structures with different time windows may be combined. In the example shown, an incoming statistical result structure 370 produced by an accumulator task is received by the aggregator task. As with the combine operation 344, the concatenate operation may be invoked once per result structure to incorporate that structure into an aggregate result structure 374 being built by the aggregator task. The figure shows two versions of the aggregator result structure, version 374a before incorporation of the result structure 370, and version 374b after incorporation of the result structure 370. In some embodiments, the concatenate operation may require statistical function and attribute fields of the two structures 370 and 374a to be the same, and the time windows (colored fields) of the two structures 370 and 374a to not overlap. If these conditions are met, the concatenate operation will create a new aggregate result structure 374b that concatenates the time windows of the two input structures 370 and 374a. As shown, the new aggregate result structure 374b here concatenates the time windows of structures 370 and 374 to include results for eight time windows. In some embodiments, the concatenate operation may be used to aggregate result structures produced by the accumulator tasks that were assigned records of different time windows.

FIG. 3C depicts yet another type of operation (merge operation 374) that may be used by an aggregator task, in some embodiments. As with the combine operation 344 of FIG. 3A and concatenate operation 372 of FIG. 3B, the merge operation 382 may also be provided as a library function, which can be used to define custom aggregator tasks. The merge operation 382 may be used to process statistical result structures for different types of statistical functions, to combine two statistical result structures with different but overlapping time windows. In the example shown, an incoming statistical result structure 380 produced by an accumulator task is received by the aggregator task. Again, the figure shows two versions of the aggregator result structure, version 384a before incorporation of the result structure 380, and version 384b after incorporation of the result structure 380. The merge operation may require statistical function and attribute fields of the two structures 380 and 384a to be the same. For this operation, however, the time windows (colored fields) for the two structures 380 and 384a can overlap. In this example, the two structures 380 and 384a overlap in two time windows from time 501 to 600. The merge operation will create a new aggregate result structure 384b that combines the overlapping time windows, and concatenates the non-overlapping time windows. As shown, the new aggregate result structure 384b here includes results for the six distinct time windows indicated in the two input result structures, including the two overlapping time windows. In some embodiments, the merge operation may be used to aggregate result structures produced by the accumulator tasks that were assigned records of different time windows.

Figure 4:
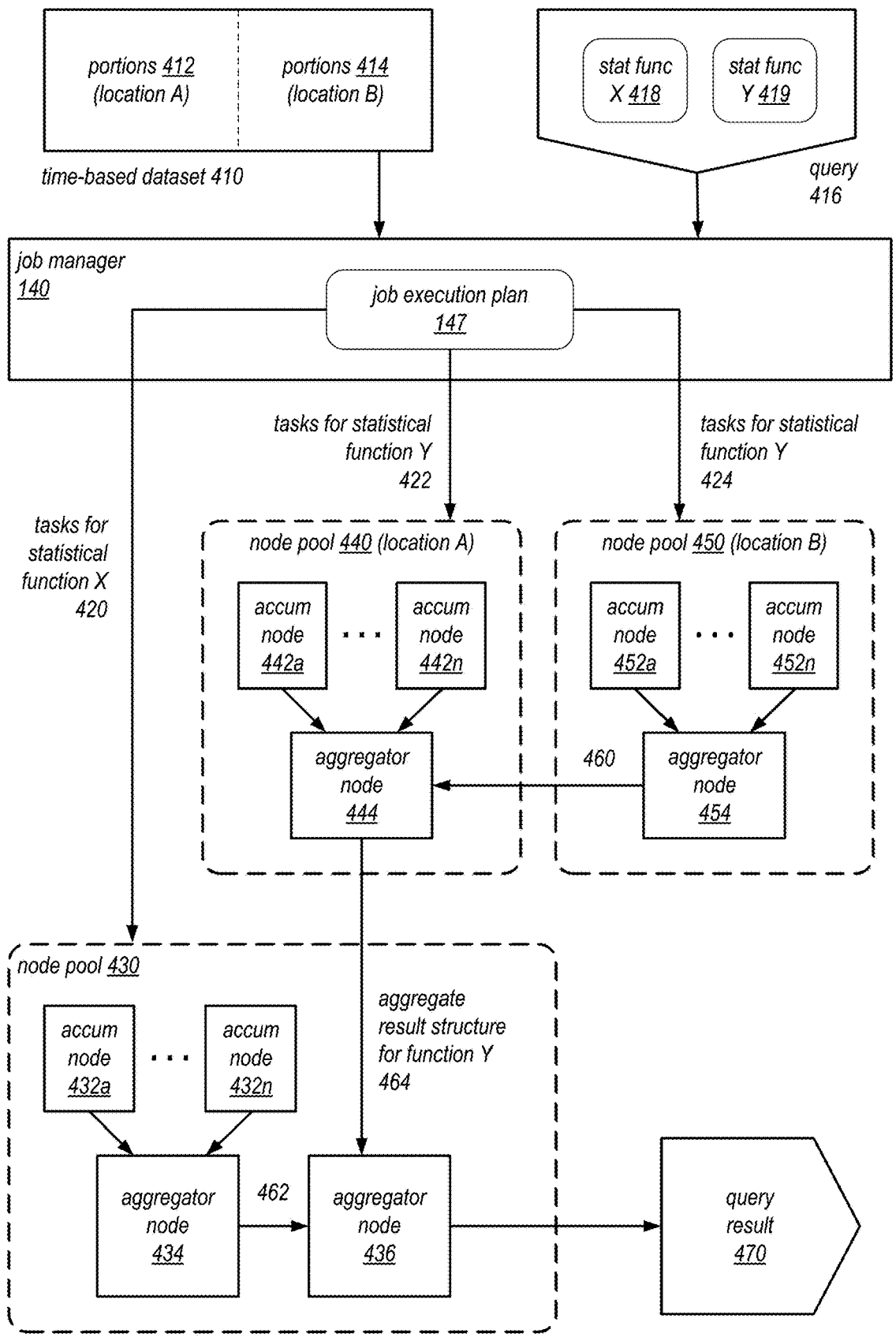
FIG. 4 illustrates a job manager of a distributed query execution system that assign tasks for different task node pools, according to some embodiments.

FIG. 4 illustrates a job manager of a distributed query execution system that assign tasks for different task node pools, according to some embodiments.

As shown in the figure, an embodiment of the job manager 140 of FIG. 1 has generated a job execution plan 147 of a query job. In this example, the time-based dataset 410 includes two sets of portions 412 and 414 that are stored across two locations, location A and location B. Depending on the embodiment, the two locations may be distinct computer networks, data storage systems, security zones, geographical locations (e.g. data centers or office sites), and the like. The query 416 in this example specifies two different statistical functions X 418 and Y 419. For example, the query may specify to compute a composite statistical function based on the two functions X and Y (e.g. max(attrib1)+max(attrib2)). As other examples, the query may use multiple statistical functions in a filter criterion (e.g. where avg(attrib1)>avg(attrib2)), or an sort criterion (e.g. order by min(attrib1), max(attrib2+attrib3)).

As shown, in some embodiments, the job manager 140 may be configured to intelligently split the statistical function computations into logical groups. As shown, the generated job execution plan 147 in this example separates the accumulator and aggregator tasks into three groups 420, 422, and 424, and the three task groups are assigned to three distinct node pools 430, 440, and 450. The three task groups may all be executed in parallel on their respective node pools. In some embodiments, the node pools may be groups of computers (e.g. virtual machine instances) that are maintained and managed by the distributed query execution system to performed distributed computation of statistical functions.

As shown, the tasks for computing statistical function Y are split by data location. A first set of tasks 422 is assigned to a node pool 440 at location A, which includes a number of accumulator nodes 442a-n and an aggregator node 444. A second set of tasks 424 is assigned to a node pool 450 at location B, which includes a number of accumulator nodes 452a-n and an aggregator node 454. The tasks are assigned in this way so that the accumulator nodes can be close to the portions of the dataset 410. Accordingly, accumulator tasks that access portions 412 are assigned to node group 440, and accumulator tasks that access portions 424 are assigned to node pool 450. In this example, one aggregator node is used at each location to aggregate the statistical result structures of the accumulator nodes, and the aggregator node 454 will provide 460 its aggregate result structure to the aggregator node 444, which will in turn incorporate that aggregate result structure into its own its own aggregate result structure.

As shown, the computation of statistical function X is assigned to a single node pool 430, which contains a number of accumulator nodes 432a-n and aggregator nodes 434 and 436. As shown, the aggregator node 434 is responsible for aggregating the result structures from accumulator nodes 432a-n. Moreover, the aggregator node 436 is responsible for aggregating the aggregator result structure 462 from the aggregator node 434 and the aggregator result structure 464 produced by the aggregator node 444. In some embodiments, the final aggregator task may be assigned to a dedicated aggregator node 436, where the final aggregation is compute-intensive, or where the final aggregator task is to be performed progressively and in parallel with the other aggregator tasks. The result of the final aggregation is then provided as the query result 470.

In the disclosed manner, the job manager 140 can decompose complicated statistical functions into a number of smaller component functions, and generate a multi-stage execution plan to compute the results of the component functions in a distributed and parallelized manner. As one example, to compute a standard deviation of a dataset attribute, the job manager may generate a first set of tasks to calculate the mean, a second set of tasks to calculate the population size, and a final aggregator task to compute the standard deviation of each attribute value. As may be appreciated by those skilled in the art, a variety of composite statistical functions may be computed in this manner.

Figure 5:
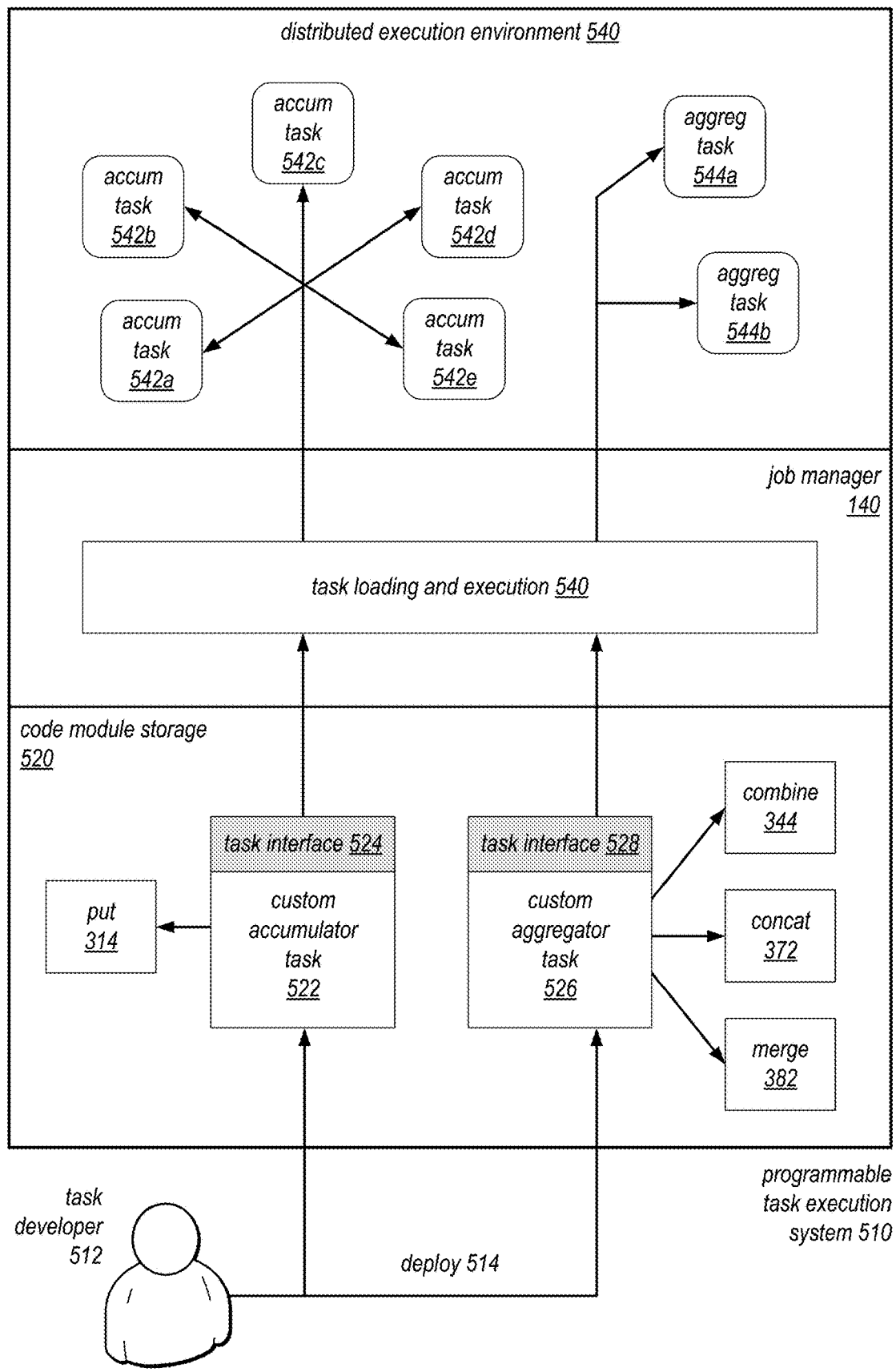
FIG. 5 illustrates an example programmable task execution system that can be used to implement a distributed query execution system to execute custom accumulator and aggregator tasks, according to some embodiments.

FIG. 5 illustrates an example programmable task execution system that can be used to implement a distributed query execution system to execute custom accumulator and aggregator tasks, according to some embodiments.

As shown, the distributed query execution system 130 of FIG. 1 may be implemented using a programmable task execution system 510. The programmable task execution system may implement a deployment and execution framework that allows task developers 512 to deploy new or custom tasks into the system, to implement new or custom functionality for computing statistical functions. For example, a task developer 512 may create a custom accumulator task 522 to read and parse a new log data repository, or implement a different type of filtering logic for records. As another example, a task developer 512 may create a custom aggregator task 526 to compute a different type of statistic. In some embodiments, these custom tasks may be specified by the task developer in source code in a type of general programming language, which allows the tasks to be implement a rich set of programmatic behaviors provided by such languages. For example, the development environment may allow custom tasks 522 and 526 to invoke built-in library modules or code modules developed by previous programmers. Such modules may provide certain low-level operations to manipulate statistical results structures such as the put 314, combine 344, concatenate 372, and merge 382 operations discussed in connection with FIGS. 3A to 3C. In some embodiments, other types of library modules may also be invoked from the custom tasks, including other custom tasks provided by other developers.

In some embodiments, the custom tasks 522 and 526 may be deployed 514 into the execution system 510 as code modules. In some embodiments, the code modules may be compiled from human-readable source code into a set of machine-executable instructions, which may be stored in a code module storage 520 (e.g. as executable files). In some embodiments, the code modules may be required to implement a particular task interface 524 or 528, which is specified by the programmable task execution system. The execution system may use these defined task interfaces to invoke the custom tasks are runtime (e.g., to provide input and output to/from the tasks and to manage the tasks). In this manner, any custom task that implements the task interface 524 and 528 will be managed in the same way by the programmable task execution system 510.

As shown, the job manager 140 in this example implements a task loading and execution component 540. The task loading and execution component 540 is configured to dynamically load and execute the custom tasks in a distributed execution environment 540. The distributed execution environment may include the task nodes 150 and 160 of FIG. 1. As discussed, the job manager 140 may assign accumulator and aggregator tasks to individual task nodes to be executed as individual processes or threads. In some embodiments, the job manager may cause the individual task nodes to launch tasks 542a-e and 544a-b by loading particular task modules into runtime memory. In other embodiments, the task nodes themselves may manage the loading of the code modules in a thread or process pool. The job manager may only assign tasks to the task nodes via an API, and may not be directly responsible for the loading and execution of task code modules.

As will be appreciated by those skilled in the art, the disclosed programmable task execution environment may be used to manage and execute any custom accumulator and aggregator tasks that implements the required task interfaces. The system allows task developers to continuously create and deploy new accumulator and aggregator tasks to augment the capabilities of the system. New deployments of custom tasks are transparently executable within the distributed execution system, without having to redeploy or recompile other systems components. In some embodiments, custom tasks or library modules deployed into the system can be invoked and reused by subsequent task developers.

FIG. 6 illustrates an example user interface used to configure operational aspects of a distributed query execution system, according to some embodiments. In some embodiments, the graphical user interface shown in the figure may be implemented as part of the configuration interface 252 of FIG. 2.

As shown, the distributed query execution configuration interface 600 is a graphical user interface that allows a user to configure a number of operational parameters of the distributed query execution system 130 of FIG. 1. The operational parameters may have default settings, so that the execution plan for query or computation jobs can be generated in a fully automated manner that is completely transparent to the user. However, the configuration interface shown here may be used by some users to override the default settings of the parameters. In some embodiments, the parameters may be configured at the system level for all clients. In some embodiments, the parameters may be configured individually for each query client.

As shown, the GUI 600 includes a section 610 that allows users to select factors that the system will take into account to decide the degree of parallelism to use computing statistical functions. The degree of parallelism may control the number of accumulator or aggregator tasks that will be generated by the task splitter 142. A computation that requires a higher degree of parallelism will result in more tasks being generated. The task splitter 142 will automatically determine the degree of parallelism or number of tasks to generate based on factors selected in the GUI 600. As shown, the list of possible factors includes the size of the time-based dataset. For example, larger datasets will cause more accumulator tasks to be generated. Another factor is the number of dataset portions (e.g. individual chunks, files, volumes, data stores, etc.) and the number of distinct locations storing dataset portions (e.g. distinct networks, data stores, data servers, geographical locations, etc.). High numbers of dataset portions or locations will cause more parallel tasks to be generated. Another factor is the time range of the statistical function specified in the query. For example, a statistical function that is to be computed over a time range of 300 days may generate more tasks than a function over seven days. In some embodiments, this factor may be less preferred than the size of the dataset because it only indirectly suggests the number of records that that need to be processed by a task (e.g. a one-minute query on one event log can involve more processing records than a 30 day query on another event log). Another factor is the number of time windows or slices that is specified for the statistical function. As discussed, the statistical function may specify to compute statistical results over multiple time windows (every hour, every day, etc.). A large number of such time windows may cause more tasks to be generated, so that individual time windows may be handled in parallel by different tasks. As may be appreciated, some query clients may prefer using a large number of time windows or slices because increasing the number of time windows improves the quality of the query result (e.g. a time slice size of one millisecond will provide a more accurate representation of the final output than a slice size of 10 seconds). By generating more tasks for more time slices, the query execution system to make better planning decisions to optimize the execution of these types of queries.

Finally, another factor to deciding degree of parallelism is the number of available task nodes. In some embodiments, the distributed query execution system may be managing pools of task nodes to compute statistical functions of many different queries. The distributed query execution system may monitor the operational state and/or utilization level of each task node to determine an availability status of each node. For example, a task node that is unresponsive or indicating long response latency may be considered unavailable. A node that is currently executing a large number of tasks (e.g. larger than a specified threshold) may also be considered unavailable. In some embodiments, when the distributed query execution system is in a state where many task nodes are unavailable, it will generate fewer tasks for new statistical function computations.

As shown, section 610 also includes a button 612 that allows a user to configure a custom policy to auto-adjust the degree of parallelism for a statistical function computation. In some embodiments, the custom policy may allow the user to select additional factors or metrics, specifically weights for the individual factors, constraints on the number of tasks to generate, or even a specific formula to calculate the number of tasks.

As shown, the GUI 600 in this example also includes a section 620, which allows users to select factors that will be used (e.g. by the task assignor 146) to assign individual accumulator and/or aggregator tasks to the task nodes. As discussed, in some embodiments, the task assignor 146 may generate a job plan 147, which may map out which tasks are assigned to which nodes. In other embodiments, the job plan may be less specific. For example, the job plan may only assign some set of tasks to some group of task nodes at the time a computation is initiated, and the precise assignment will be determined later during the computation (e.g. based on how quickly individual tasks are completed by individual nodes).

As shown in this example, the factors that may be considered by the task assignor 146 includes the location of the dataset portion (e.g. accumulator tasks will be assigned to nodes that are close to or have local access to a dataset portion associated with the task), the current load of the task node (e.g. a node with light load will be preferred over one under heavy load), and other task node properties (e.g. a node with more RAM will be preferred for more memory-intensive tasks). As shown, a button 622 is provided to allow users to configure a custom policy for task assignments. The custom policy may include more specific rules for assigning tasks to task nodes, such as assignment constraints, weights or priorities of the factors, or specific formulas for choosing task nodes.

Finally, in this example, a section 630 is provided to allow users to configure the auto-recovery behavior of the distributed query execution system. In some embodiments, when an individual accumulator or aggregator task fails, the distributed query execution system may be configured to automatically retry that task. The ability to retry individual tasks of the computation improves the robustness of computation execution, allowing large computations to easily and automatically recover from minor errors during execution without having to repeat the entire computation. As shown, section 630 also include a button 633 to configure a custom policy for the auto-recovery behavior. Such a policy may specify configuration details such as how many times a task retry will be attempted, how (or whether) to select a new task node for the retry, and when a distributed computation is deemed to be unrecoverable (e.g. when the percentage of failed tasks in a job exceed a threshold level). As may be appreciated by those skilled in the art, a variety of operational aspects of the distributed query execution system may be configurable via a configuration interface such as GUI 600.

Figure 7:
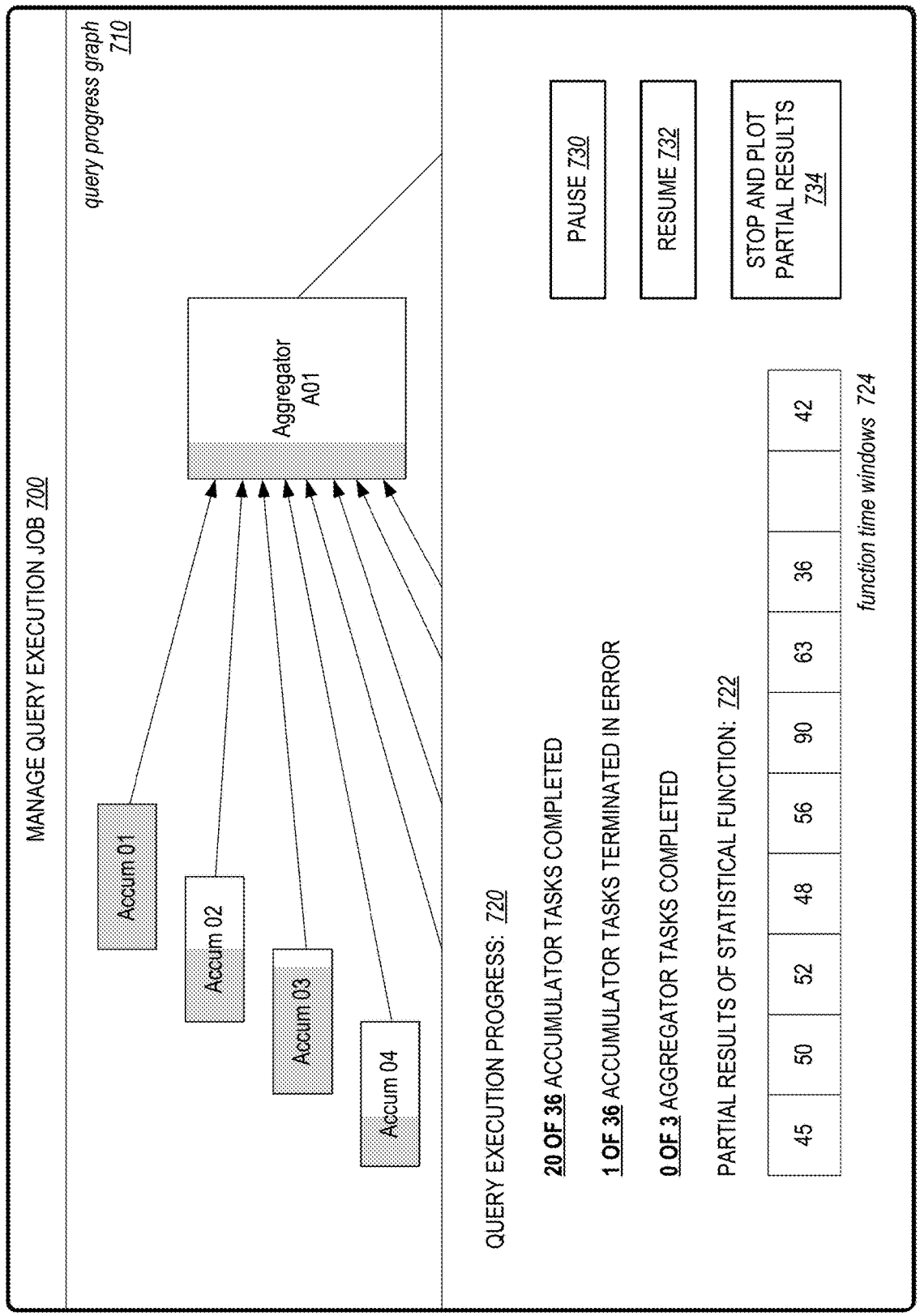
FIG. 7 illustrates an example user interface used to manage a query execution job in a distributed query execution system, according to some embodiments.

FIG. 7 illustrates an example user interface used to manage a query execution job in a distributed query execution system, according to some embodiments. In some embodiments, the graphical user interface shown in the figure may be implemented as part of job management interface 254 of FIG. 2.

As shown, the query execution job management interface 700 may be implemented as a GUI that allows a user to view and control the execution of a query or statistical function computation, which in some cases may take a substantial amount of time to complete. In some embodiments, the progress information displayed on the GUI 600 may be generated by the job progress tracker 180 of FIG. 1.

As shown, the GUI 700 includes a graph area that displays a query progress graph 710. The progress graph may be generated from the job plan 147 of FIG. 1. The progress graph includes graph nodes for individual accumulator tasks and aggregator tasks generated for a query job. The edges in the graph represent dependencies among the tasks (e.g. that task A produces a result structure that is consumed by task B). In this example, the progress of individual tasks is shown as progress meters on each graph node. In some embodiments, such per-task progress information may be tracked by the job manager 140 or job progress tracker 180, which may periodically obtain this information from the task nodes (e.g. the amount of assigned records that have been processed). In other embodiments, the progress graph may provide only a qualitative progress indicator for each task (e.g. "in progress," "completed," or "failed"). In some embodiments, the GUI 700 may allow the user to view further details about the progress of each task, for example, by clicking on individual graph nodes within the graph. In some embodiments, the GUI 700 may allow the user to control individual tasks using the graph, for example, to pause, resume, cancel, restart, or skip individual tasks.

As shown, the GUI 700 also includes section 720 that allows the user to view and control the job's overall progress. In this example, section 720 displays a number of progress metrics of the query job or statistical computation, including the number of accumulator tasks that have completed, the number of aggregator tasks that have completed, and the number of accumulator tasks that had terminated in error. Section 720 also provides a partial results element 722 that indicates the partial results of the statistical function as determined based on tasks that have currently completed. In this example, the statistical function being computed specifies 10 time windows 724, and the partial results of the function are shown for each time window. These partial results may be determined based on the current state of the aggregate result structure being built by an aggregator task. As with the query progress graph 710, the information shown in section 720 may be updated dynamically as the query job or statistical function computation progresses.

As shown, section 720 also includes a number of buttons 730, 732, and 734 that allow the user to control the execution of the query job or statistical function computation progresses. Button 730 may be clicked to pause the computation, and button 732 may be used to resume a paused computation. In some embodiments, pausing a computation may cause the job manager to store metadata indicating the current progress state of the computation. This progress state can be used by the resume operation to resume the computation, without having to re-execute tasks that have already completed. In some embodiments, any task that have not yet completed at the time of the pause will be re-executed from the beginning when the computation is resumed. In some embodiments, the pause operation may cause each task to serialize its intermediate state (e.g. the last record sequence number in the dataset that was processed and the current state of its statistical result structure). The resume operation may then use this intermediate state to continue the task from the last record that was the processed by paused task. Finally, the stop and plot button 734 may simply cause the statistical function computation to be stopped, and the partial results 722 of the computation to be displayed. In some embodiments, the partial results of the statistical function computation may be displayed graphically as a time plot or graph, indicating the results of the function for each time window 724. In some embodiments, the partial results may be provided via the query interface 256 of FIG. 2.

Figure 8:
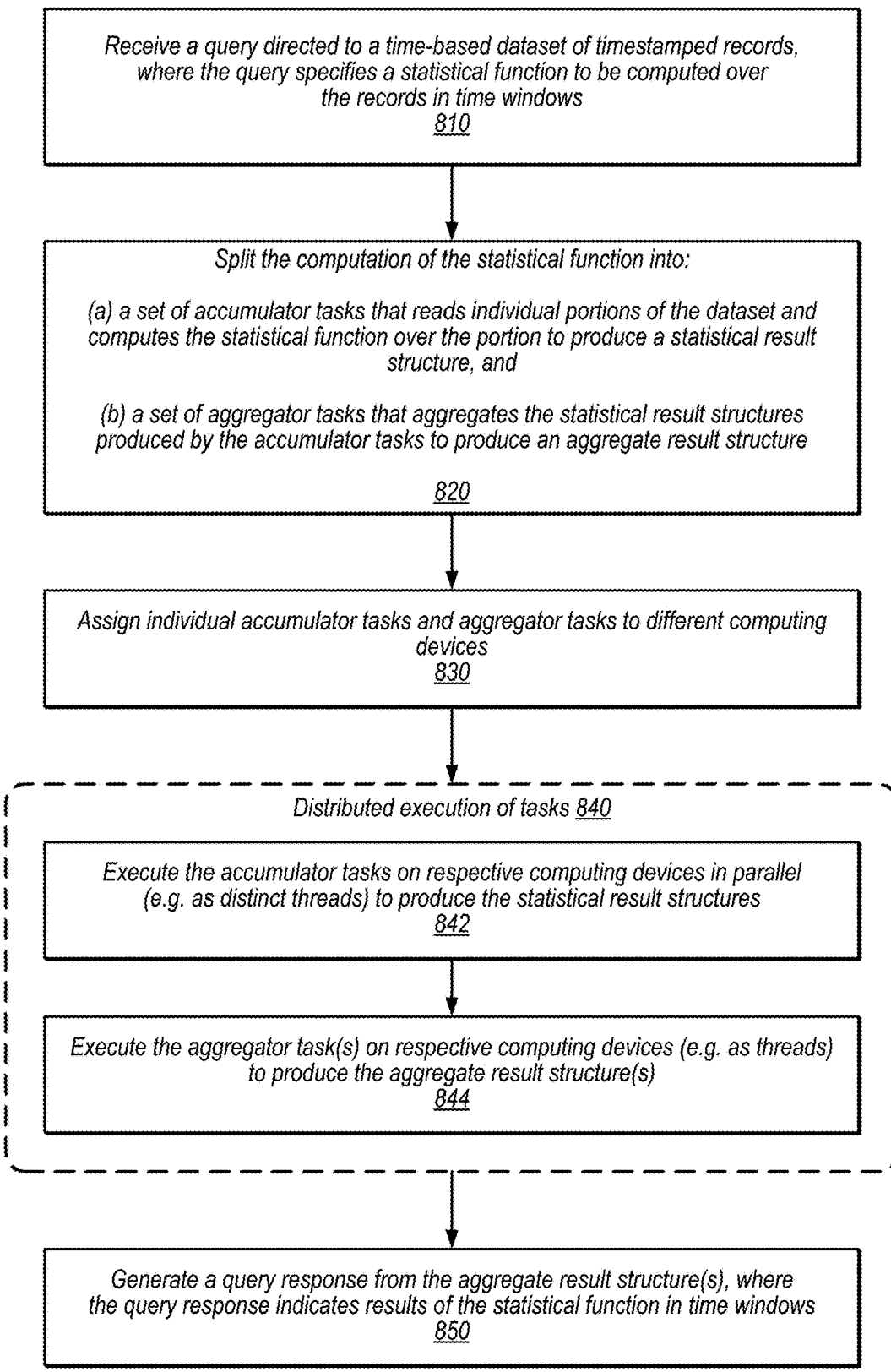
FIG. 8 is a flowchart illustrating aspects of a query execution process performed by a distributed query execution system, according to some embodiments.

FIG. 8 is a flowchart illustrating aspects of a query execution process performed by a distributed query execution system, according to some embodiments. In some embodiments, the process shown in the figure may be performed by the distributed query execution system of FIG. 1.

The process begins at operation 810, where a query (e.g. query 110) is received. The query is directed to a time-based dataset of timestamped records (e.g. dataset 120), which may not be stored in a time-sequence order. The query specifies a statistical function (e.g. statistical function 112) that is to be computed over the records in one or more time windows. For example, the time-based dataset may include one or more log files what include log records of time-stamped events. The statistical function may specify to compute a statistic for the records (e.g. min, max, or total of a record attribute) over each time window (e.g. the last 10 days). In some embodiments, the query may be received via a user interfaces such as a command line interface or GUI. In some embodiments, the query may be received via a programmatic interface such as an API or a web service interface. In some embodiments, the query may be specified in a query language such as SQL or some other specialized query language.

At operation 820, the computation of the statistical function is split into two sets of tasks: (a) a set of accumulator tasks (e.g. accumulator tasks 148) that reads a portion of the dataset and computes the statistical function over individual dataset portions to produce a statistical result structure (e.g. statistical result structure 154), and (b) a set of aggregator tasks (e.g. aggregator task 149) that aggregates the statistical result structures produced by the accumulator tasks to produce an aggregate result structure (e.g. aggregator result structure 149). In some embodiments, this operation may be performed by the job manager 140 of FIG. 1 or the task splitter component 142 of FIG. 1. In some embodiments, the tasks may be split along different types of split dimensions, which may be configurable by the user. In some embodiments, tasks may be generated for individual portions of the dataset (e.g. individual files). In some embodiments, tasks may be generated for individual time windows specified for the statistical function. In some embodiments, tasks may be generated for individual locations of the dataset (or task nodes that has local access to individual portions of the dataset). In some embodiments, tasks may be generated based on a combination of multiple split dimensions. The task splitting process may generate a set of tasks that can be executed independently and in parallel by distinct task nodes.

At operation 830, the individual accumulator and aggregator tasks are assigned to different computing devices (e.g. different accumulator task nodes 152 and aggregator task nodes 162). In some embodiments, this operation may be performed by the task assignor component 146 of FIG. 1. In some embodiments, the task nodes may be individual instance of virtual machine. In some embodiments, the task nodes are maintained in one or more node pools (e.g. node pools 430, 440, or 450) that can be reused for different distributed statistical function computations. In some embodiments, the assignment may produce a job plan 147 that maps individual tasks to individual task nodes, and this plan may be used by other components such as the job progress tracker 180 to track the progress and status of the query execution job or statistical function computation. In some embodiments, the splitting operation 820 and the assignment operation 830 may themselves be performed by one or more of the task nodes. For example, the query execution system may select a coordinator node from the task nodes to act as the job manager 140 for each query or statistical function computation. In some embodiments, the assignment of tasks to task nodes may be controlled by an assignment policy, which may be configurable by the user. The assignment policy may indicate to assign tasks to task nodes based on the location of the dataset portion associated with the task, the current load or operation condition of the task nodes, and/or the capabilities or properties of the task nodes. In some embodiments, accumulator tasks may be assigned to nodes that have local access to the dataset portion associated with the task.

As shown, operations 842 and 844 are performed as part of the distributed execution of tasks, which may be performed in parallel across many task nodes. At operation 842, the accumulator tasks are executed on respective computing devices in parallel to produce individual statistical results structures. In some embodiments, the accumulator tasks may be executed as individual processes or threads. The accumulator tasks may be configured to read a portion of the timestamped records in the dataset and compute the statistical function over the portion of records. In some embodiments, the accumulator task may execute a put operation (e.g. put operation 314) for each incoming record, and update the statistical result structure to incorporate the statistical function results of that record. In some embodiments, the statistical result structure will include result metadata, including the time range of the statistical function, the time window(s) of the statistical function, and window sizes of the statistical function. In some embodiments, the statistical result structure may indicate the type of statistical function (e.g. stat field 334) and the record attribute(s) (e.g. attr field 335) that the function is to be computed on. In some embodiments, the statistical result structure may include intermediate values for computing the statistical function (e.g. counters field 336) and the currently computed result of the statistical function (e.g. values field 337). These statistical result structures will be updated repeatedly until all assigned records for the accumulator task have been processed.

At operation 844, the aggregator task(s) are executed on respective computing devices to produce individual aggregate results structures. Depending on the job plan, the distributed query execution system may use only one aggregator task (and one aggregator task node) for some computations. When multiple aggregator task and aggregator task nodes are used, the aggregator tasks may be executed in parallel. In some embodiments, the aggregator tasks may be executed as individual processes or threads. The aggregator to receive statistical result structures produced by multiple accumulator tasks as they become available (e.g. in a FIFO queue), and repeatedly combine these result structures into an aggregate result structure. In some embodiments, the aggregator task may employ a number of different types of library operations to incorporate individual result structures, such as a combine operation 344, a concatenate operation 372, and a merge operation 382. In some embodiments, the combine operation may require that the two input result structures (the incoming statistical result structure and the aggregate result structure) have the same set of time windows. As discussed in connection with FIG. 3B, the concatenate operation may operate over input result structures having different time windows, but these time windows may not overlap. As discussed in connection with FIG. 3C, the merge operation may also operate over input result structures having different time windows, and these time windows may overlap. When the result structures for all accumulator tasks have been incorporated into the aggregate result structure, the aggregator task is completed.

At operation 850, a query response (e.g. query response 170) is generated for the query. The query response may be generated based on the aggregate result structure produced by the distributed computation of the statistical function. The query response may indicate results of the statistical function in each of the specified time window of the function. In some embodiments, the query response may be provided via a GUI, and may include a graphical time plot that indicates the statistical function results of each of the time windows.

Figure 9:
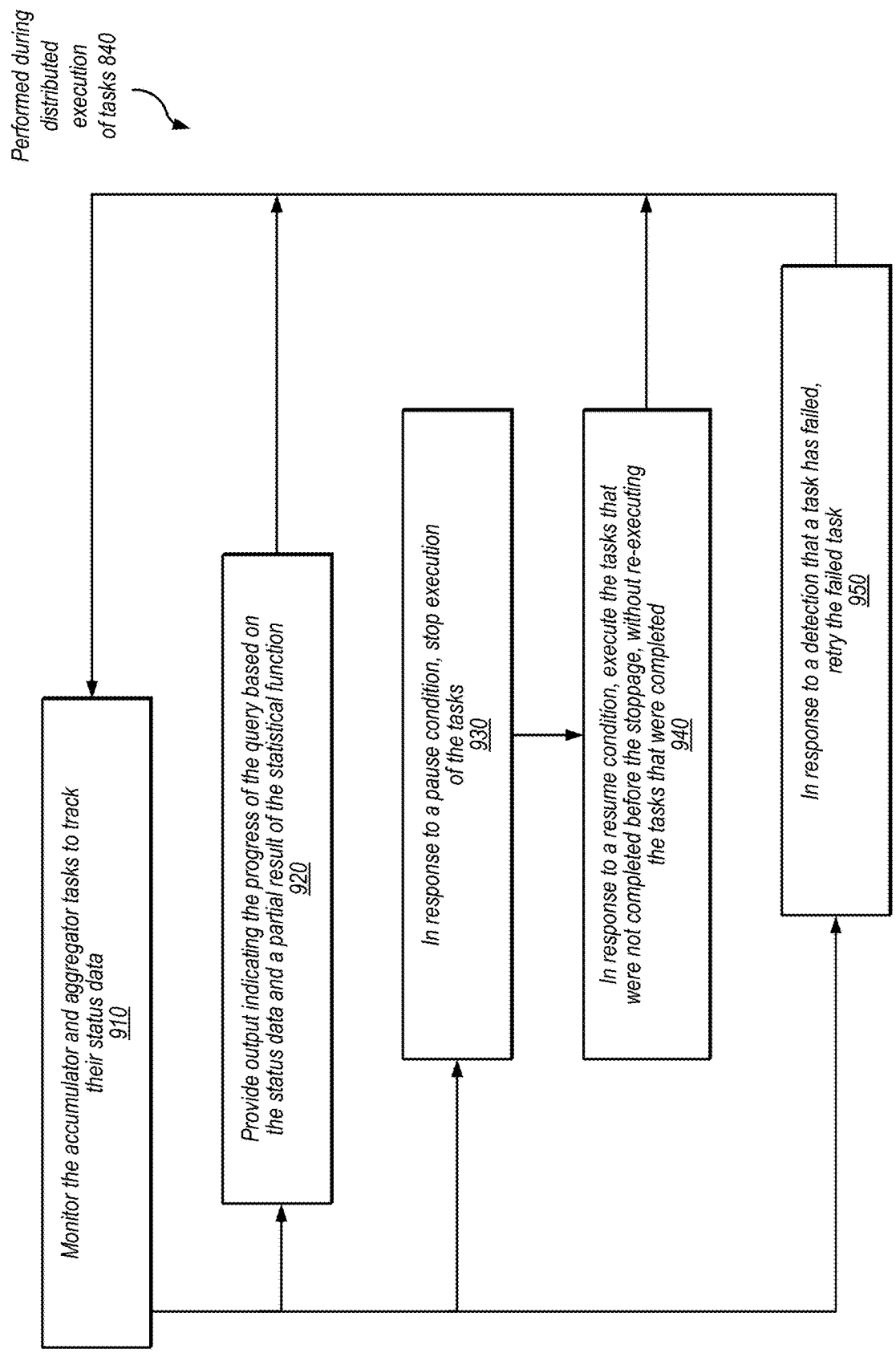
FIG. 9 is a flowchart illustrating aspects of a job monitoring and management process performed by a distributed query execution system, according to some embodiments.

FIG. 9 is a flowchart illustrating aspects of a job monitoring and management process performed by a distributed query execution system, according to some embodiments. In some embodiments, the process shown in the figure may be performed by the job manager 140 of FIG. 1. As shown, the depicted process is performed during the distributed execution of tasks 840, as discussed in connection with FIG. 8. As discussed, in some embodiments, the job manager may be implemented by a task node 152 or 162, and a different task node is selected to act as the job manager for each query or statistical function computation.

As shown in the figure, the depicted monitoring process implements a process loop, where the executing aggregator and accumulator tasks are continuously or periodically monitored 910 to trigger certain operations during the distributed execution. At operation 910, the accumulator and aggregator tasks are monitored to track their status data. In some embodiments, this monitoring may be performed by the job progress tracker 180 of FIG. 1. The tracked status data may include progress data of the task. The progress data may indicate whether a task is currently in progress, completed, or failed. In some embodiments, the progress data also indicate how much of the task has been completed (e.g. as a percentage of all records or result structures assigned to that task). In some embodiments, the status data may also indicate different operational metrics of the task node, such as the health and load conditions of the node. Such information may be tracked by the job manager for future task assignments. Depending on the embodiment, the monitoring of the tasks may be performed using an inter-node communication protocol, which may be pulled by the job manager node or pushed by the task nodes. In some embodiments, the task nodes may log their status data to a data storage location where the job manager node can periodically access.

At operation 920, an output indicating a progress of the progress of the query is provided. The progress may be determined based on the status or progress data of operation 910. Moreover, the output may also indicate a partial result (e.g. partial result 722) of the statistical function. In some embodiments, the progress and the partial result may be provided via a GUI (e.g. GUI 700), and dynamically updated as the query execution or statistical function computation progresses, to give the user a real time view of the computation progress.

At operation 930, execution of the tasks is stopped in response to a pause condition. In some embodiments, the pause condition may be generated based on user input, for example, a user interaction with a GUI component (e.g. button 730) to pause job execution. In some embodiments, the pause condition may be generated by a machine (e.g. to stop the tasks temporarily to perform housekeeping on the node pool). In some embodiments, pausing the tasks may cause certain metadata or intermediate data about the tasks to be serialized, which may be may be later used to resume the tasks. Depending on the embodiment, such metadata or intermediate data may include the completion or progress status of the task and the current state of the result structure being built by the task. In some embodiments, the metadata or intermediate data simply be tracked by the job manager without the tasks themselves having to perform any extra work to serialized the data.

At operation 940, execution of the tasks is resumed in response to a resume condition. The resume condition may be generated based on user input, for example, a user interaction with a GUI component (e.g. button 732) to resume job execution. In some embodiments, to resume the tasks, the job manager may examine the task metadata and intermediate data of the tasks at the time of the pause, and re-execute those the tasks that were not completed before the prior stoppage. Those tasks that had completed will not be re-executed. Rather, the result structures that the produced will be used to continue execution of the remaining tasks. In this manner, resumption of a statistical function computation will not require much of the work performed prior to the pause to be repeated.

At operation 950, in response to a detection that a task has filed, the failed task is automatically retried. In some embodiments, this retry feature may be a configurable feature of the distributed query execution system (e.g. the auto-recovery configuration feature 630 of FIG. 6). Depending on the configuration, a failed task may be retried by re-executing the task. In some embodiments, the re-execution may be assigned to a different task node, or be attempted after some passage of time. In some embodiments, a specified number of retry attempts may be made before the task is abandoned. As may be appreciated, by breaking a large statistical function computation into many independent tasks, the system is able to recover from errors much more easily and quickly by reperforming only a small part of the computation.

Figure 10:
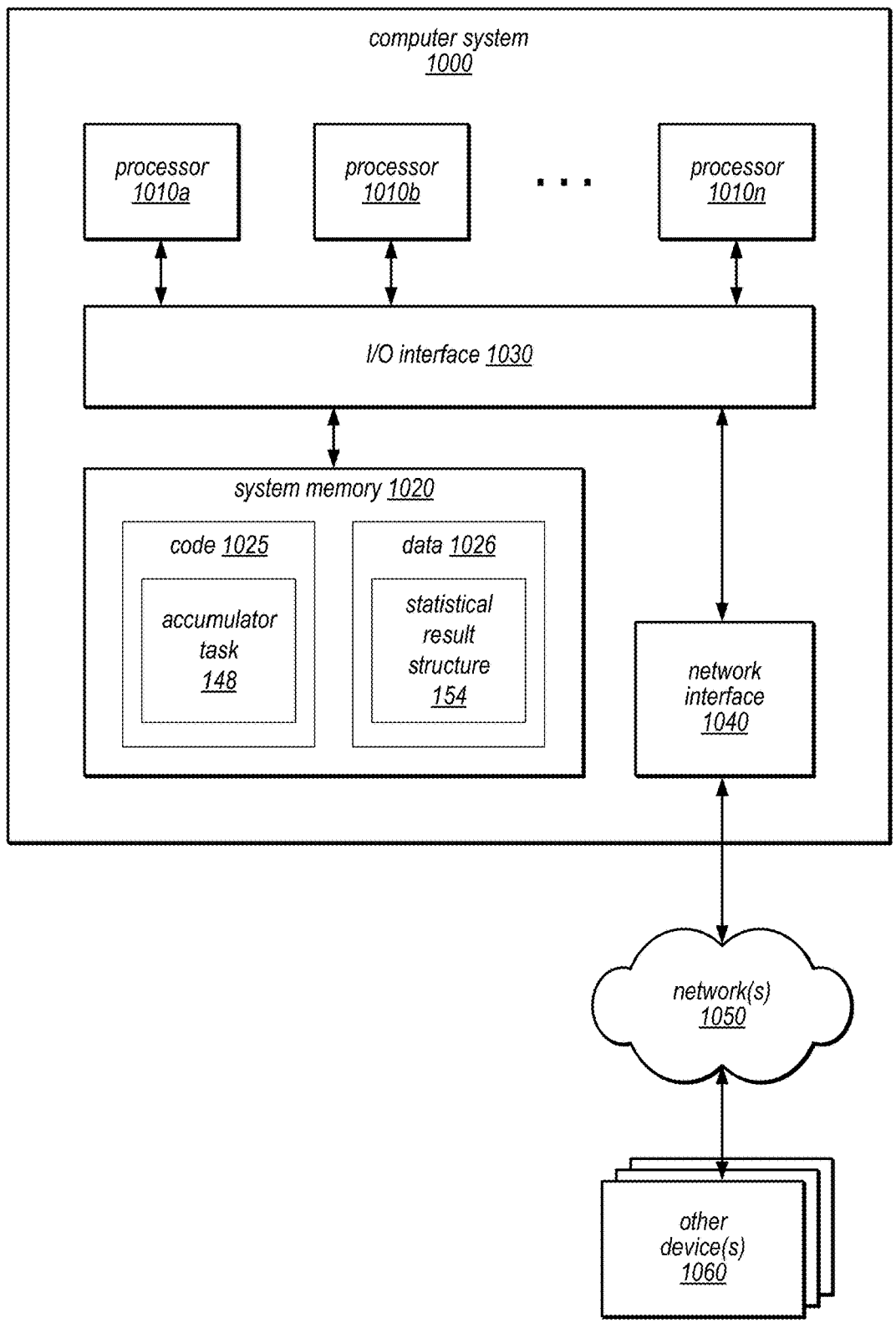
FIG. 10 is a block diagram illustrating an example computer system that can be used to implement one or more portions of distributed query execution system, according to some embodiments.

FIG. 10 is a block diagram illustrating an example computer system that can be used to implement one or more portions of distributed query execution system, according to some embodiments. For example, the computer system 1000 may be a server that implements one or more components of the distributed query execution system 130 of FIG. 1.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, these some of these other devices may be implemented locally on the computer system 1000, accessible via the I/O interface 1030. In various embodiments, persistent storage devices may include to disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement executable modules of an accumulator task 148, as discussed. The system memory 1020 may also be used to store data 1026 needed by the executable instructions. For example, the in-memory data 1026 may include a statistical result structure 154, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A method, comprising:
performing, by one or more hardware processors with associated memory that implement a distributed query execution system on a network:
receiving a query directed to a time-based dataset, wherein the time-based dataset includes a plurality of timestamped records that are not stored in timestamp order, and the query specifies a statistical function to be computed over the records in a plurality of time windows, and in response to the query:
splitting the computation of the statistical function into:
(a) a plurality of accumulator tasks that individually reads a respective portion of the time-based dataset and computes the statistical function over the respective portion to produce a statistical result structure for the respective portion, wherein the statistical result structure includes a metadata field that indicate a number of time windows represented by the statistical result structure and a statistical function field that indicates the statistical function specified by the query, and
(b) at least one aggregator task that aggregates the statistical result structures produced by the accumulator tasks to produce an aggregate result structure based on the field in the statistical result structures;
assigning individual one of the accumulator tasks to respective ones of a plurality of accumulators implemented by respective computing devices;
sending one or more messages over the network to the accumulators, wherein the one or more messages causes individual ones of the accumulators to execute respective ones of the accumulator tasks in parallel to produce the statistical result structures;
sending the statistical result structures over the network to an aggregator implemented by a computing device to cause the aggregator to execute the aggregator task on the statistical result structures to produce the aggregate result structure; and
returning a response to the query, wherein the response is generated from the aggregate result structure and indicates one or more results of the statistical function computed over the plurality of time windows.

2. The method of claim 1, wherein:
the response is returned via a graphical user interface, and includes a time graph that indicates the results of the statistical function over the plurality of time windows.

3. The method of claim 1, wherein the distributed query execution system is implemented as part of a machine monitoring service, and further comprising performing, by the machine monitoring service:
collecting machine events from a plurality of machines;
logging the machine events as the timestamped records in the time-based dataset.

4. The method of claim 1, wherein:
the time-based dataset includes a plurality of files; and
the splitting of the statistical function into the plurality of accumulator tasks comprises creating one accumulator task for each file.

5. The method of claim 1, wherein:
the splitting of the statistical function into the plurality of accumulator tasks comprises generating one accumulator task to compute the statistical function for one set of the time windows and another accumulator task to compute the statistical function for a different set of the time windows.

6. The method of claim 1, wherein the splitting of the statistical function into the plurality of accumulator tasks comprises:
determining a number of accumulator tasks to create based on one or more of:
a size of the time-based dataset;
a number of portions of the time-based dataset;
a number of different locations storing the portions of the time-based dataset;
a time range for computing the statistical function;
a number of time windows to compute the statistical function; or
a number of task nodes available to assign the accumulator or aggregator tasks.

7. The method of claim 1, wherein:
each accumulator task accesses a respective portion of the time-based dataset, and individual ones of the computing devices have local access to different ones of the portions; and each accumulator task is assigned to a computing device that has local access to the respective portion that the accumulator task accesses.

8. A system, comprising:
one or more hardware processors with associated memory that implement a distributed query execution system on a network, configured to:
receive a query directed to a time-based dataset, wherein the time-based dataset includes a plurality of timestamped records that are not stored in timestamp order, and the query specifies a statistical function to be computed over the records in a plurality of time windows, and in response to the query:
split the computation of the statistical function into:
(a) a plurality of accumulator tasks that individually reads a respective portion of the time-based dataset and computes the statistical function over the respective portion to produce a statistical result structure for the respective portion, wherein the statistical result structure includes a metadata field that indicate a number of time windows represented by the statistical result structure and a statistical function field that indicates the statistical function specified by the query, and
(b) at least one aggregator task that aggregates the statistical result structures produced by the accumulator tasks to produce an aggregate result structure based on the field in the statistical result structures;
assign individual one of the accumulator tasks to respective ones of a plurality of accumulators implemented by respective computing devices;
send one or more messages over the network to the accumulators, wherein the one or more messages causes individual ones of the accumulators to execute respective ones of the accumulator tasks in parallel to produce the statistical result structures;
send the statistical result structures over the network to an aggregator implemented by a computing device to cause the aggregator to execute the aggregator task on the statistical result structures to produce the aggregate result structure; and
return a response to the query, wherein the response is generated from the aggregate result structure and indicates one or more results of the statistical function computed over the plurality of time windows.

9. The system of claim 8, wherein the distributed query execution system is implemented as part of a programmable task execution system that implements one or more task interfaces to implement additional accumulator and aggregator tasks, and is configured to:
receive one or more code modules that implement a custom accumulator task and a custom aggregator task according to the one or more task interfaces; and
execute the one or more code modules to perform the custom accumulator task and the custom aggregator task on the computing devices to execute a custom query.

10. The system of claim 8, wherein the accumulators are configured to generate individual statistical result structures that indicate:
a set of time windows to be computed for the statistical function,
a record attribute on which to compute the statistical function, and
respective results of the statistical function for each time window in the set.

11. The system of claim 8, wherein to execute the aggregator task, the aggregator is configured to:
receive the statistical result structures from the accumulators in an order that the statistical result structures are completed; and
repeatedly update a copy of aggregate result structure to incorporate each statistical result structure.

12. The system of claim 11, wherein to execute the aggregator task, the aggregator is configured to:
combine two statistical result structures that have a same set of time windows, wherein the combining combines respective statistical function results of corresponding time windows of the of the two statistical result structures.

13. The system of claim 12, wherein to execute another aggregator task for another query, the aggregator is configured to:
perform a concatenate operation on two other statistical result structures that do not have overlapping time windows, wherein the concatenate operation concatenates the time windows of the two other statistical result structures; and
perform a merge operation on two additional statistical result structures that have one or more overlapping time windows and one or more non-overlapping time windows, wherein the merge operation combines respective statistical function results of the one or more overlapping time windows and concatenates statistical function results of the one or more non-overlapping time windows.

14. The system of claim 8, wherein to split the computation of the statistical function, the distributed query execution system is configured to generate a plurality of aggregator tasks that are executed in parallel by a plurality of aggregators.

15. The system of claim 8, wherein:
the query specifies two or more statistical functions to be computed over the time-based dataset, including a first statistical function and a second statistical function; and
the distributed query execution system is configured to split the first statistical function into a first set of accumulator tasks that are executed in parallel and the second statistical function into a second set of accumulator tasks that are executed in parallel.

16. One or more non-transitory computer-accessible storage media storing program instructions that when executed on or across one or more processors implement at least a portion of a distributed query execution system on a network and cause the distributed query execution system to:
receive a query directed to a time-based dataset, wherein the time-based dataset includes a plurality of timestamped records that are not stored in timestamp order, and the query specifies a statistical function to be computed over the records in a plurality of time windows, and in response to the query:
split the computation of the statistical function into:
(a) a plurality of accumulator tasks that individually reads a respective portion of the time-based dataset and computes the statistical function over the respective portion to produce a statistical result structure for the respective portion, wherein the statistical result structure includes a metadata field that indicate a number of time windows represented by the statistical result structure and a statistical function field that indicates the statistical function specified by the query, and (b) at least one aggregator task that aggregates the statistical result structures produced by the accumulator tasks to produce an aggregate result structure based on the field in the statistical result structures;

assign individual one of the accumulator tasks to respective ones of a plurality of accumulators implemented by respective computing devices;

send one or more messages over the network to the accumulators, wherein the one or more messages causes individual ones of the accumulators to execute respective ones of the accumulator tasks in parallel to produce the statistical result structures;

send the statistical result structures over the network to an aggregator implemented by a computing device to cause the aggregator to execute the aggregator task on the statistical result structures to produce the aggregate result structure; and return a response to the query, wherein the response is generated from the aggregate result structure and indicates one or more results of the statistical function computed over the plurality of time windows.

17. The one or more non-transitory computer-accessible storage media of claim 16, wherein the program instructions when executed on or across the one or more processors cause the distributed query execution system to:

monitor the plurality of accumulator tasks to track status data of the accumulator tasks;

generate output indicating progress of the query based at least in part on the status data of the accumulator tasks.

18. The one or more non-transitory computer-accessible storage media of claim 17, wherein the program instructions when executed on or across the one or more processors cause the distributed query execution system to:

responsive to a pause condition to pause execution of the query, cause the plurality of accumulator tasks to stop, wherein the stopping causes the status data to indicate that a first set of accumulator tasks have completed and that a second set of accumulator tasks have not completed; and responsive to a resume condition to resume execution of the query, cause the second set of accumulator tasks to be executed without re-executing the first set of accumulator tasks that have completed.

19. The one or more non-transitory computer-accessible storage media of claim 17, wherein the program instructions when executed on or across the one or more processors cause the distributed query execution system to:

before completion of the computation of the statistical function, output a partial result of the statistical function based on accumulator tasks that have completed.

20. The one or more non-transitory computer-accessible storage media of claim 16, wherein to split of the statistical function into the plurality of accumulator tasks, the program instructions when executed on or across the one or more processors cause the distributed query execution system to:

determine a number of accumulator tasks to create based on one or more of:
a size of the time-based dataset;
a number of portions of the time-based dataset;
a number of different locations storing the portions of the time-based dataset;
a time range for computing the statistical function;
a number of time windows to compute the statistical function; or
a number of task nodes available to assign the accumulator or aggregator tasks.

\* \* \* \* \*